(12) United States Patent
Hare et al.

(10) Patent No.: US 10,862,278 B2
(45) Date of Patent: *Dec. 8, 2020

(54) CIRCUIT BREAKER INTERNAL MANIPULATOR AND DOOR LOCK

(71) Applicant: M&I Electric, LLC, North Canton, OH (US)

(72) Inventors: Neal Thomas Hare, Katy, TX (US); Thomas Matthew Stevens, Groves, TX (US)

(73) Assignee: M&I Electric, LLC, Houston, TX (US)

( * ) Notice: Subject to any disclaimer, the term of this patent is extended or adjusted under 35 U.S.C. 154(b) by 77 days.

This patent is subject to a terminal disclaimer.

(21) Appl. No.: 16/204,366

(22) Filed: Nov. 29, 2018

(65) Prior Publication Data

US 2019/0103733 A1 Apr. 4, 2019

Related U.S. Application Data

(63) Continuation-in-part of application No. 15/350,101, filed on Nov. 13, 2016, now Pat. No. 10,177,543.
(Continued)

(51) Int. Cl.
*H02B 1/30* (2006.01)
*H01H 71/52* (2006.01)
(Continued)

(52) U.S. Cl.
CPC ......... *H02B 1/306* (2013.01); *E05B 47/0001* (2013.01); *E05B 47/026* (2013.01);
(Continued)

(58) Field of Classification Search
CPC ...... H01H 71/04; H01H 71/505; H01H 71/46; H01H 83/20; H01H 71/525; H01H 71/52; H01H 75/04; H01H 3/30; H01H 71/0207; H01H 71/2463; H01H 71/126; H01H 83/04; H01H 73/50; H01H 1/226; H01H 71/0214; H01H 73/30; H01H 71/58; H01H 71/10; H01H 3/46; H02B 11/133; H02B 1/36; H02B 11/24; H02H 1/0015; H02H 1/06; H02H 3/335
See application file for complete search history.

(56) References Cited

U.S. PATENT DOCUMENTS 1,853,745 A * 4/1932 Rea .................. H01H 75/04
335/34
1,909,540 A * 5/1933 Jensen .................. H01H 19/36
200/7

(Continued)

*Primary Examiner* — Adam B Dravininkas
(74) *Attorney, Agent, or Firm* — Cullen Kiker; Orgain Bell & Tucker, LLP

(57) ABSTRACT

The disclosed invention ensures safe operation of an electrical switchgear by preventing an operator from contacting or interacting with an active circuit breaker. The locking system prevents a door to the interior of the switchgear from opening until the circuit breaker is in a disengaged position. A circuit breaker decoupler, accessible from the exterior of the switchgear, directly manipulates the circuit breaker into disengagement and also allows physical manipulation of the circuit breaker. By having the decoupler and tool interface in the same device, this removes the need to open the arc covers, negating arc resistance.

8 Claims, 29 Drawing Sheets

Related U.S. Application Data

(60) Provisional application No. 62/255,519, filed on Nov. 15, 2015.

(51) Int. Cl.
*E05B 47/00* (2006.01)
*H01H 71/12* (2006.01)
*E05B 47/02* (2006.01)
*E05B 65/00* (2006.01)
*H02B 11/133* (2006.01)

(52) U.S. Cl.
CPC ............ *H01H 71/12* (2013.01); *H01H 71/52* (2013.01); *E05B 65/0089* (2013.01); *H02B 11/133* (2013.01)

(56) References Cited

U.S. PATENT DOCUMENTS

| | | | | |
|---|---|---|---|---|
| 1,938,408 | A * | 12/1933 | Thumim | H01H 3/30 335/73 |
| 2,304,606 | A * | 12/1942 | Seelye | H01H 1/20 200/243 |
| 2,645,688 | A * | 7/1953 | De Smidt | H01H 9/22 200/50.19 |
| 2,847,497 | A * | 8/1958 | Appleton | H01H 9/08 174/544 |
| 3,197,582 | A * | 7/1965 | Norden | H01H 3/001 200/50.1 |
| 3,219,771 | A * | 11/1965 | Umphrey | H02B 11/24 200/50.25 |
| 3,559,121 | A * | 1/1971 | Powell | H01H 71/70 335/68 |
| 3,793,493 | A * | 2/1974 | Wilson | H01H 33/46 200/50.24 |
| 5,945,648 | A * | 8/1999 | M'Sadoques | H01H 71/66 200/43.14 |
| 6,160,228 | A * | 12/2000 | Gerbert-Gaillard | H02B 11/133 200/50.21 |
| 10,177,543 | B2 * | 1/2019 | Hare | H01H 71/04 |
| 2004/0129546 | A1 * | 7/2004 | Deylitz | H02B 11/127 200/501 |
| 2009/0014292 | A1 * | 1/2009 | Lyu | H02B 11/133 200/50.26 |
| 2011/0147173 | A1 * | 6/2011 | Lee | H02B 11/127 200/50.25 |

\* cited by examiner

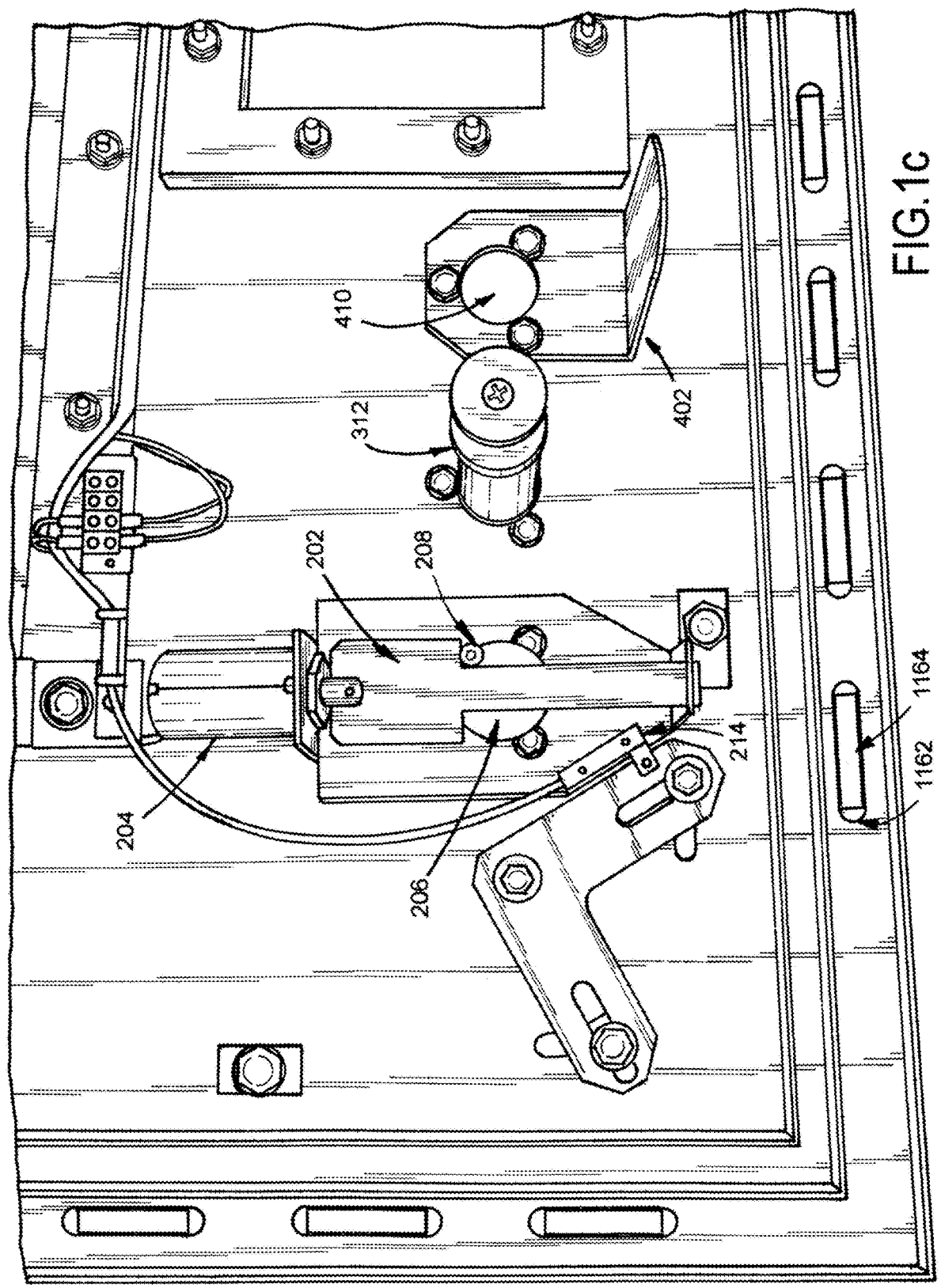

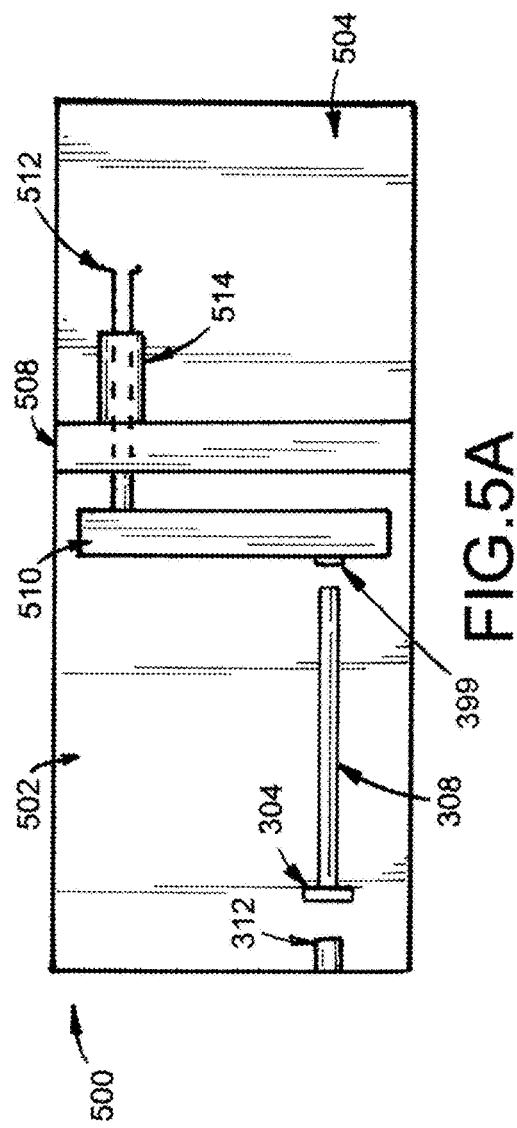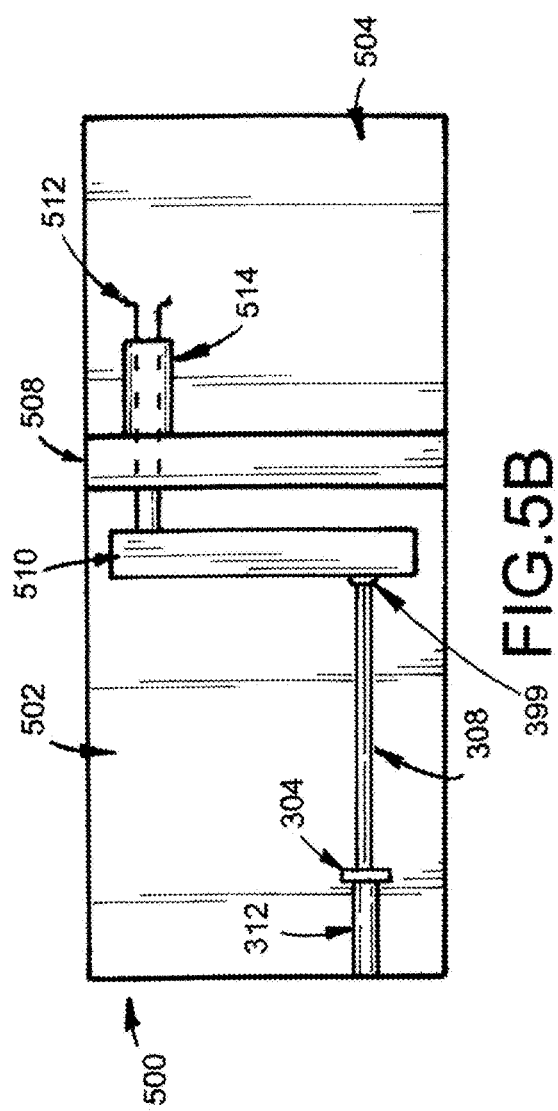

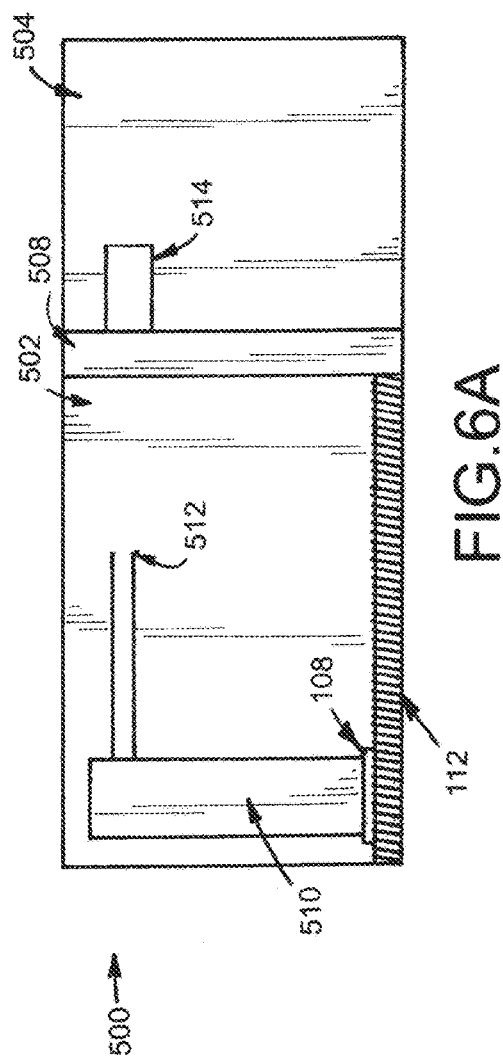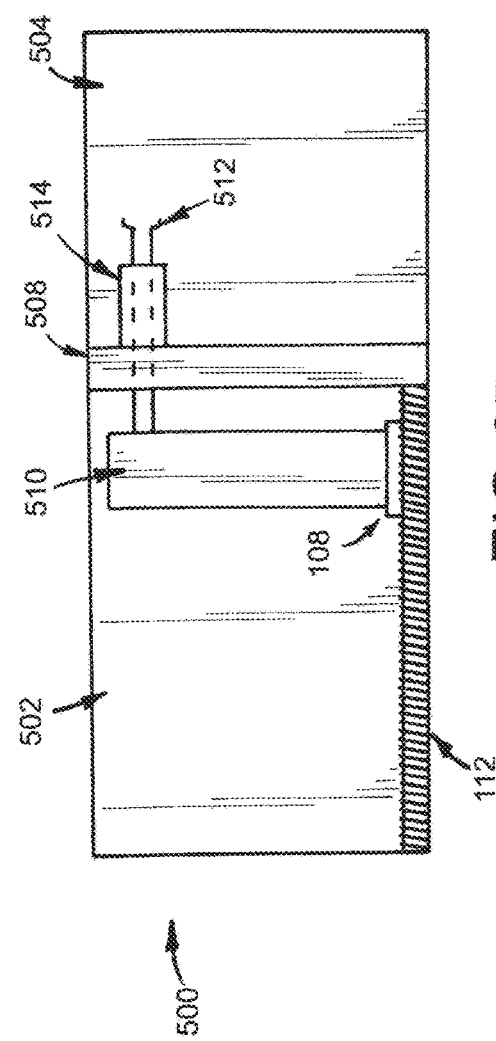

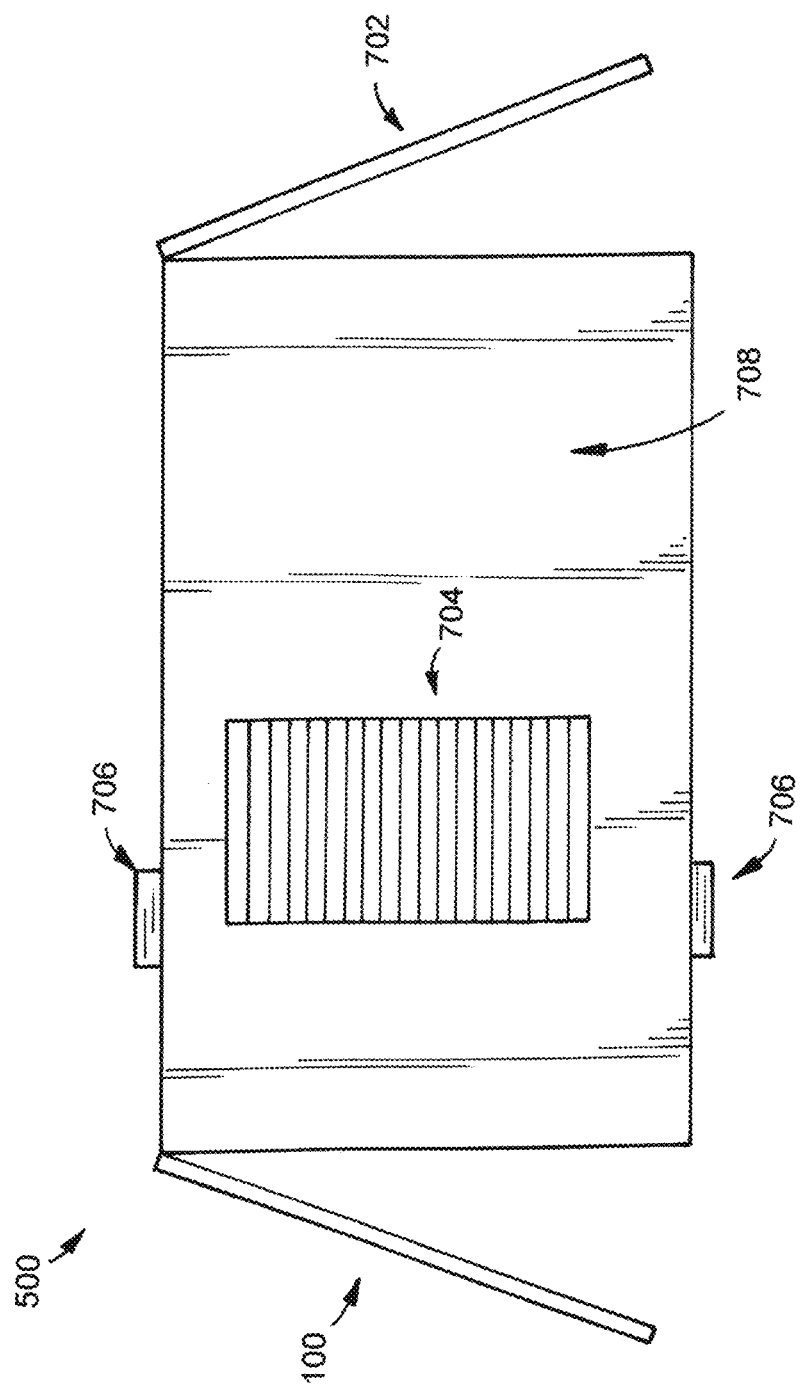

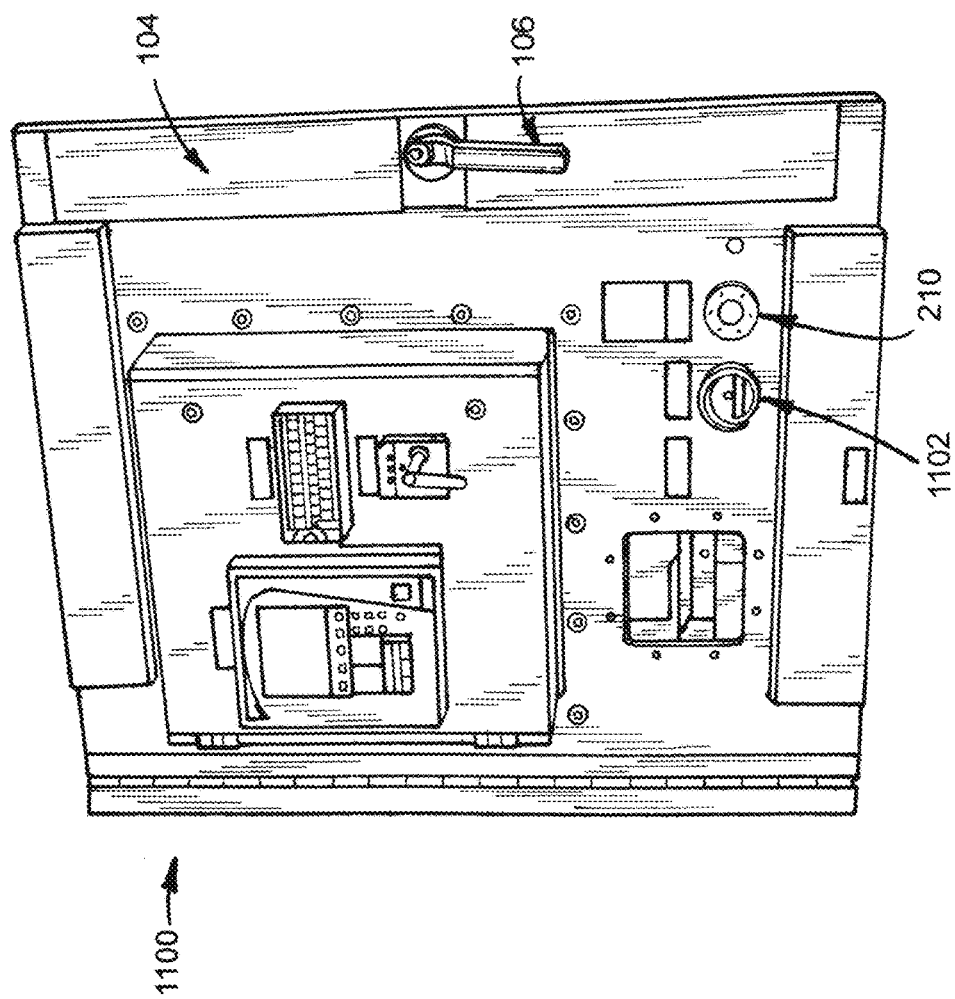

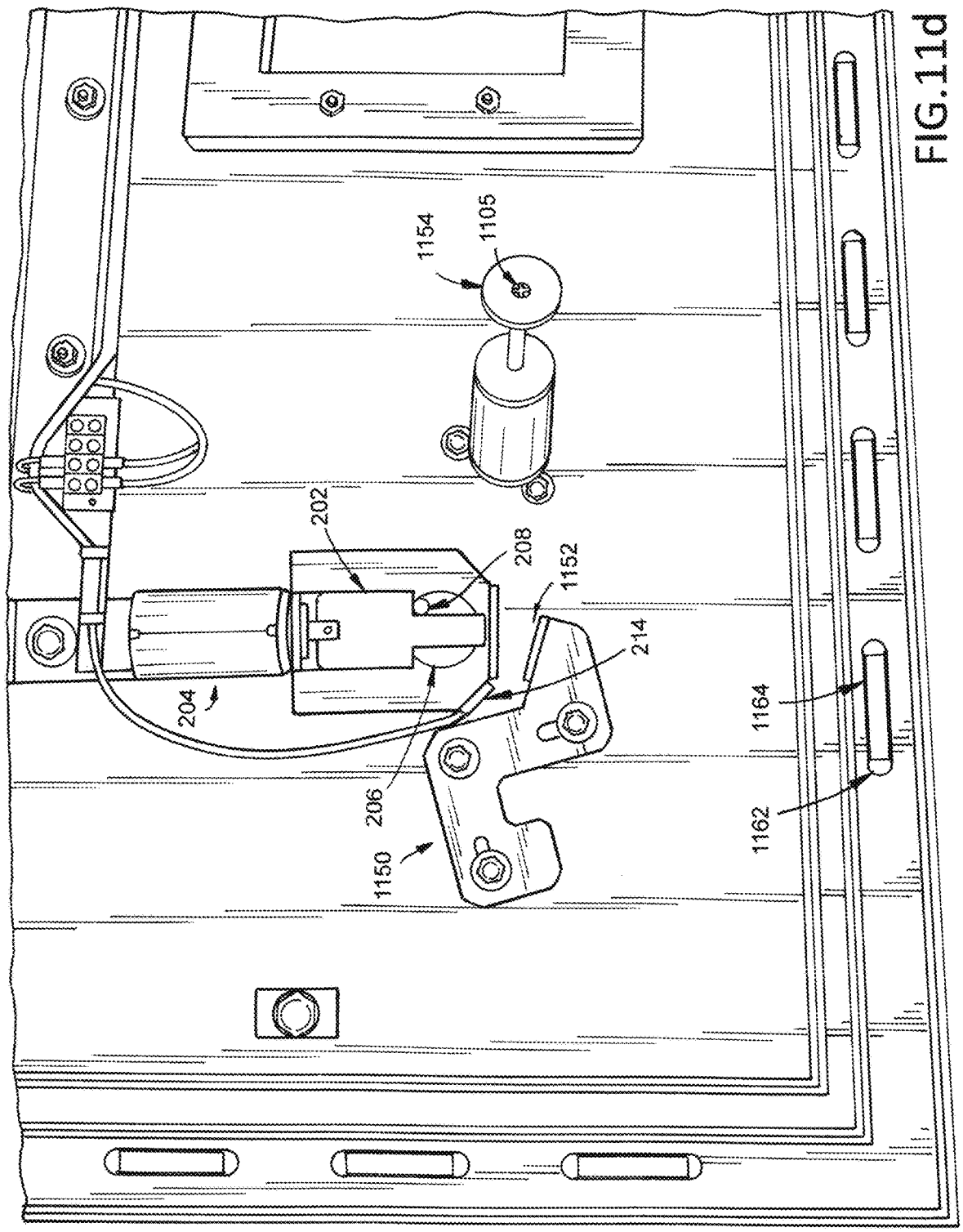

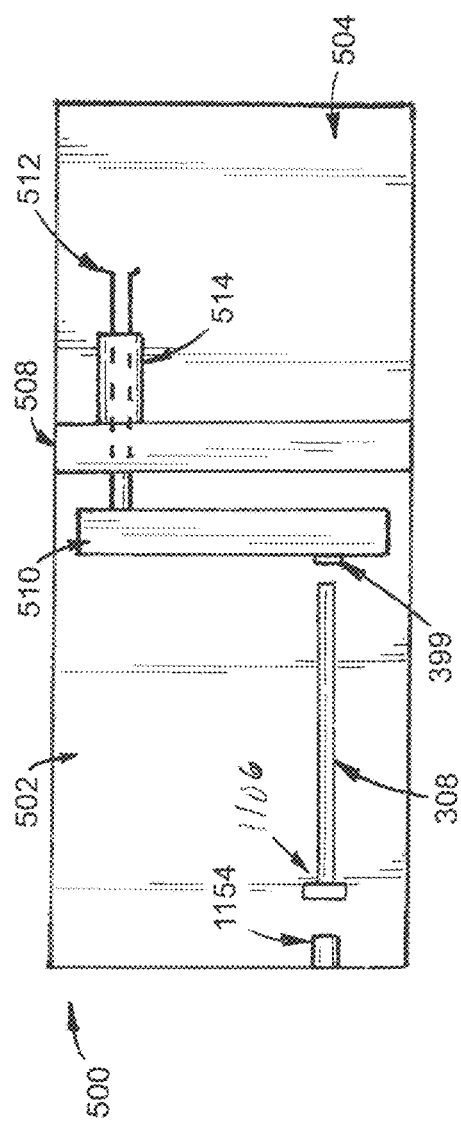
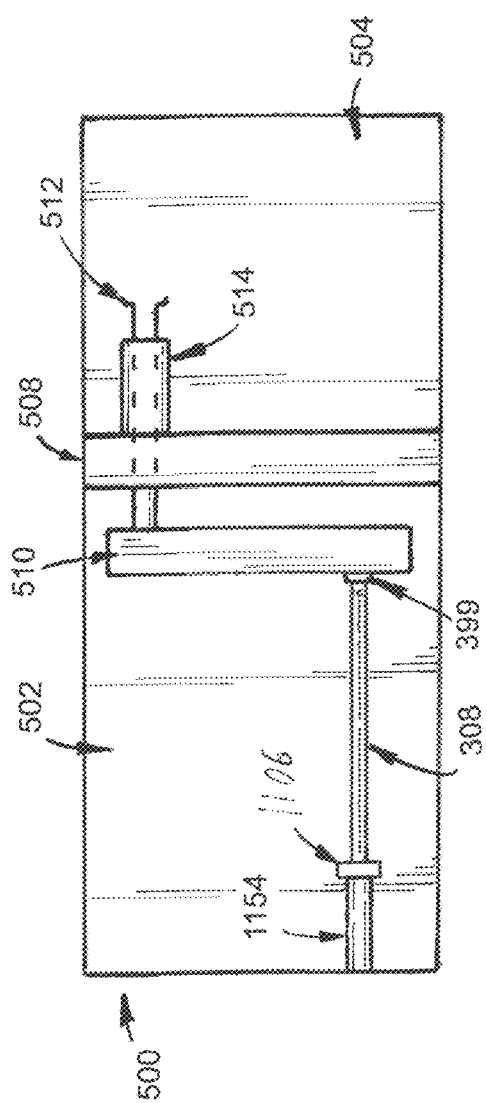

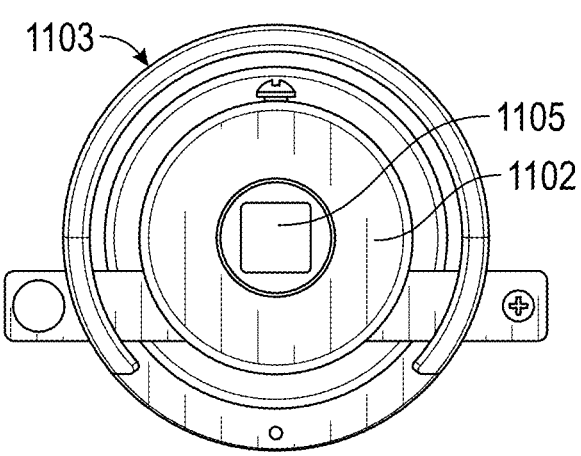
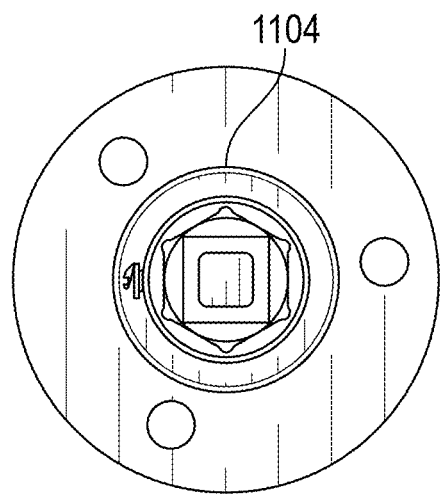
FIG. 17C    FIG. 17D
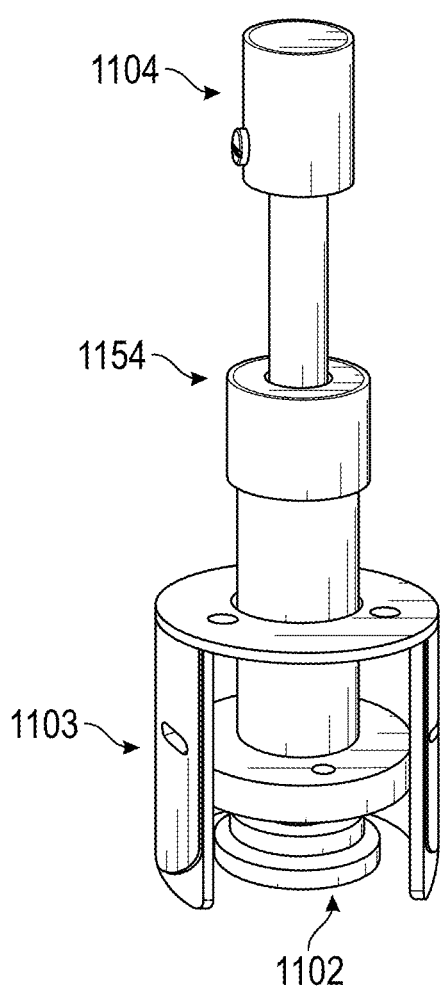
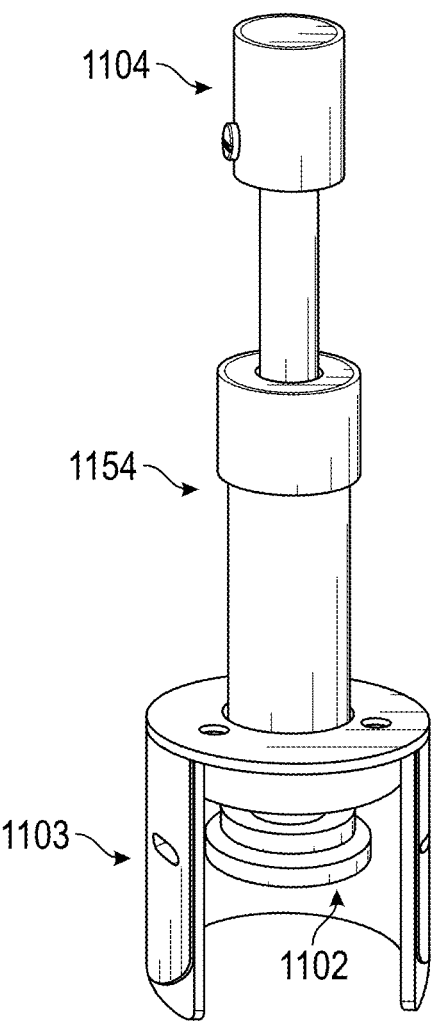
FIG. 17E    FIG. 17F

CIRCUIT BREAKER INTERNAL MANIPULATOR AND DOOR LOCK

PRIORITY/CROSS REFERENCE TO RELATED APPLICATION

This continuation-in-part application claims priority to Non-Provisional patent application Ser. No. 15/350,101 entitled "Electrical Switchgear Manual Safety System and Mechanisms" filed by Neal Thomas Hare and Thomas Matthew Stevens on Nov. 13, 2016. That application was based on Provisional Patent Application No. U.S. 62/255,519 entitled "Electrical Switchgear Manual Safety System and Mechanisms" by Neal Thomas Hare and Thomas Matthew Stevens filed on Nov. 15, 2015. Those applications are incorporated by reference in their entirety.

FIELD OF THE INVENTION

The invention involves a safety mechanism to prevent a switchgear with a live current from being opened. Specifically, it prevents any release of the locking mechanism while the switchgear contains a device with a live current and allows movement of a circuit breaker while maintaining arc resistance.

BACKGROUND OF THE INVENTION

Switchgears are safety mechanisms that enclose circuit breakers to protect operators from being exposed to potentially lethal amounts of electrical current running though power distribution centers. Switchgears allow the operator to manipulate the circuit breaker as needed while preventing direct contact with the circuit breaker when it is coupled to a power supply.

In previous switchgear embodiments, there has been a tradeoff between operator accessibility and operator safety. Switchgears may allow easy operator access to the circuit breaker, but risk exposing an operator to an electrical current. Alternatively, switchgears may prevent access to the circuit breaker, requiring the operator to damage part of the switchgear in order to access the circuit breaker. There is a need in the industry for a switchgear that allows easy operator access that incorporates safety systems to prevent operator interaction with a circuit breaker while there is electrical current running through a switchgear.

There is a further need to maintain arc resistance when dealing with circuit breakers. Additional safety features prevent any accidents related to the technology. One way to prevent these accident involves making sure that a switchgear cannot be open unless certain conditions are met. Additionally, safety may be increased if the circuit breaker position could be modified if it could be done in a manner that would prevent a loss of switchgear arc resistance.

BRIEF SUMMARY OF INVENTION

This disclosed invention has independent systems that may work individually or in concert to protect an operator from exposure to a powered circuit breaker. These are the Door Interlock Device (DID), the Manual Trip and Lockout (MT/L), the Manual Racking Handle Exclusion Device (MRHED), the Circuit Breaker Door Lock (CBDL), and the Arc Resistant Manipulator (ARM).

The DID comprises a series of locking mechanisms and sensors 214 coupled to the circuit breaker access compartment door 100 and the cable access compartment door 702. These locking mechanisms and sensors are connected to a logic circuit or any device capable of equivalent operations. The logic circuit receives information from sensors throughout the switchgear 500 that prevent doors that restrict access to the circuit breaker 510 from being opened unless certain conditions are met. In an exemplary embodiment, a sensor may be any device used to determine the status of the invention, including proximity sensors and micro switches.

The MT/L is a device that can disable the circuit breaker 510 within the switchgear 500 from an external switch on the circuit breaker access compartment door 100 or any other surface of the switchgear 500. By activating the MT/L switch button 302, a decoupler 308 is activated, which will trip the circuit breaker 510.

The MRHED is an internal manipulation restriction device that prevents the use of a manual ratcheting handle for manipulating the racking device 108 that can move the circuit breaker 510 from a disengaged location to an engaged location within the switchgear 500. This is accomplished by obstructing access to the worm gear 112 the while the circuit breaker access compartment door 100 is opened, preventing manipulation of the racking device 108 unless the circuit breaker access compartment door 100 is closed.

The CBDL is a locking mechanism that provides additional safeguards to prevent access to the interior of a switchgear 500 while a circuit breaker 510 is active. The locking bar 202 prevents the latching mechanism 1160 from disengaging while the circuit breaker 510 is active. By restricting the latching mechanism 1160, the locking bar 202 prevents access to the interior of the switchgear 500 when the circuit breaker 510 is active.

The ARM 1101 is a mechanism that allows manipulation of the circuit breaker 510 without the need to break the arc seal on the switchgear 500. In an exemplary embodiment, it is integrated with the manipulator shutdown switch 1102 used to disable the circuit breaker 510 by interfacing with the racking device 108 and allowing manipulation of the circuit breaker 510 within the switchgear 500 without opening the CBDL door 1100, preserving the arc resistance.

DETAILED DESCRIPTION OF DRAWINGS

FIG. 1a is an external view of a switchgear circuit breaker access compartment door 100 in an exemplary embodiment.

FIG. 1b is a view of an external section of the circuit breaker access compartment door 100 with the DID override 210 exposed, the MT/L switch button 302 with a switch restrictor 314, and the mechanical access outer aperture 410 exposed in an exemplary embodiment.

FIG. 5a is a view of the MT/L with the decoupler 308 in a non-tripped position with the worm gear 112 omitted.

Figure 1A:
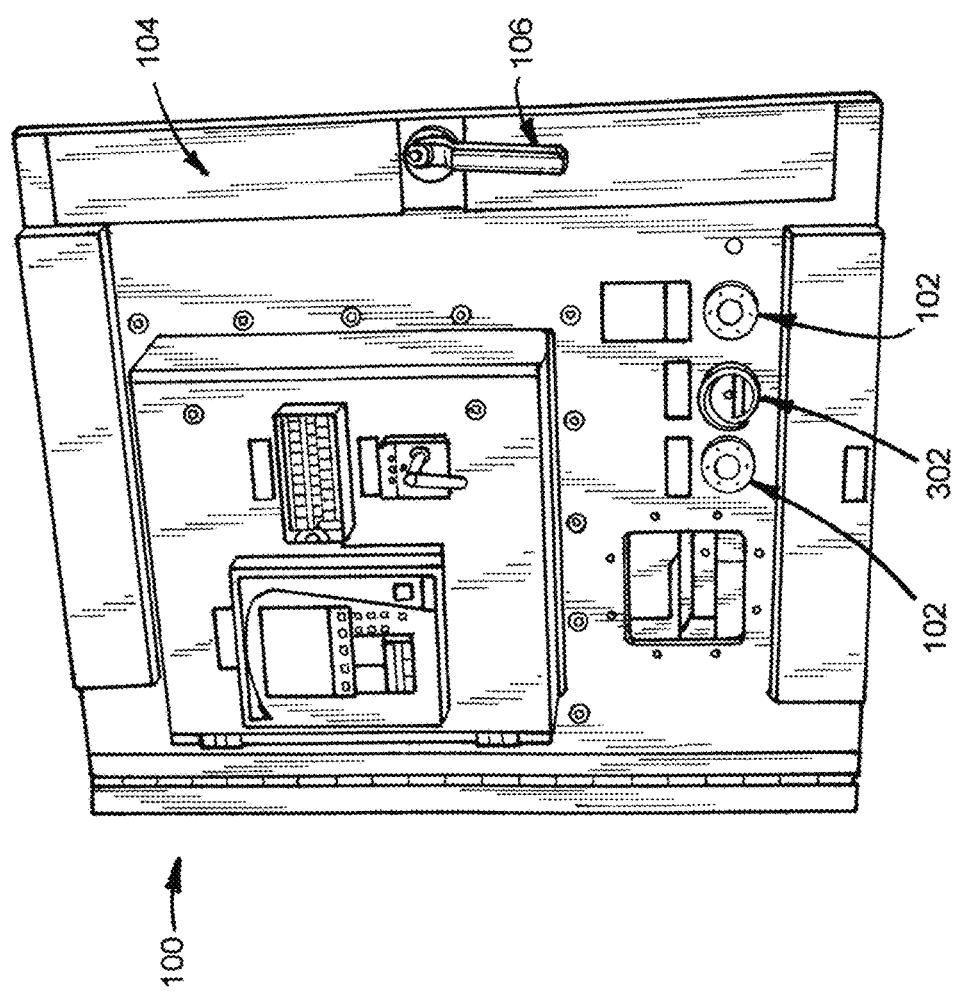
FIG. 1c is an internal view of a section of switchgear circuit breaker access compartment door 100 that corresponds to the elements show in FIG. 1b in an exemplary embodiment.
FIG. 1d is an internal view of the mechanism at the base of the switchgear 500 in an exemplary embodiment.

FIG. 5b is a view of the MT/L with the decoupler 308 in a tripped position and acting on the circuit breaker 510 with the worm gear 112 omitted.

FIG. 6a is a view of the circuit breaker 510 coupled in the racking device 108 in the installation position with the rod 312 and the decoupler 308 omitted.

FIG. 6b is a view of the circuit breaker 510 coupled in the racking device 108 in the engaged position with the rod 312 and the decoupler 308 omitted.

FIG. 7 is a top down view of the switchgear 500 showing the enclosure 708, the circuit breaker access compartment door 100, and the cable access compartment door 702 in open positions.

Figure 8:
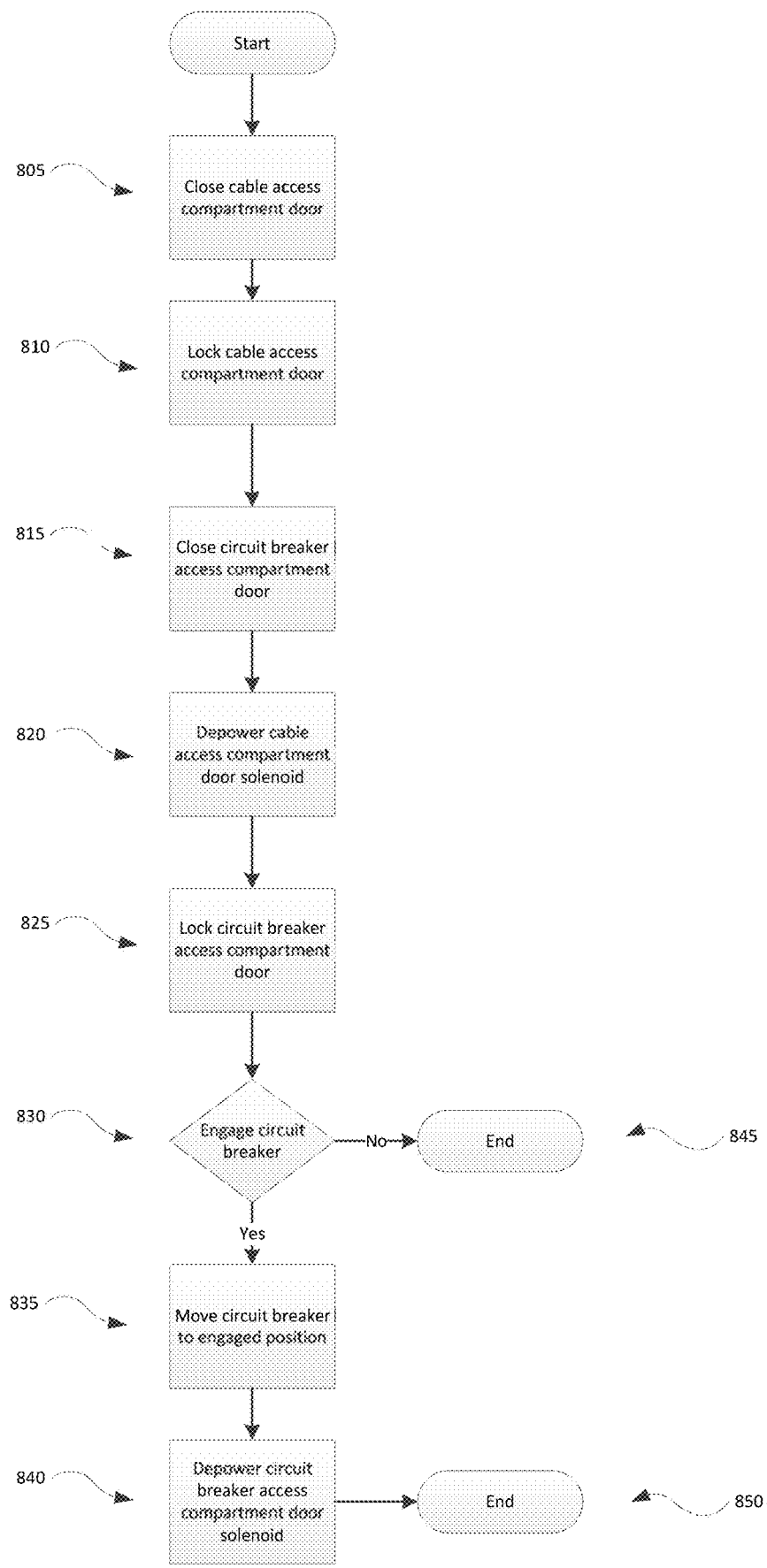

FIG. 8 is a flow chart illustrating the logic of the DID to close a door.

Figure 9:
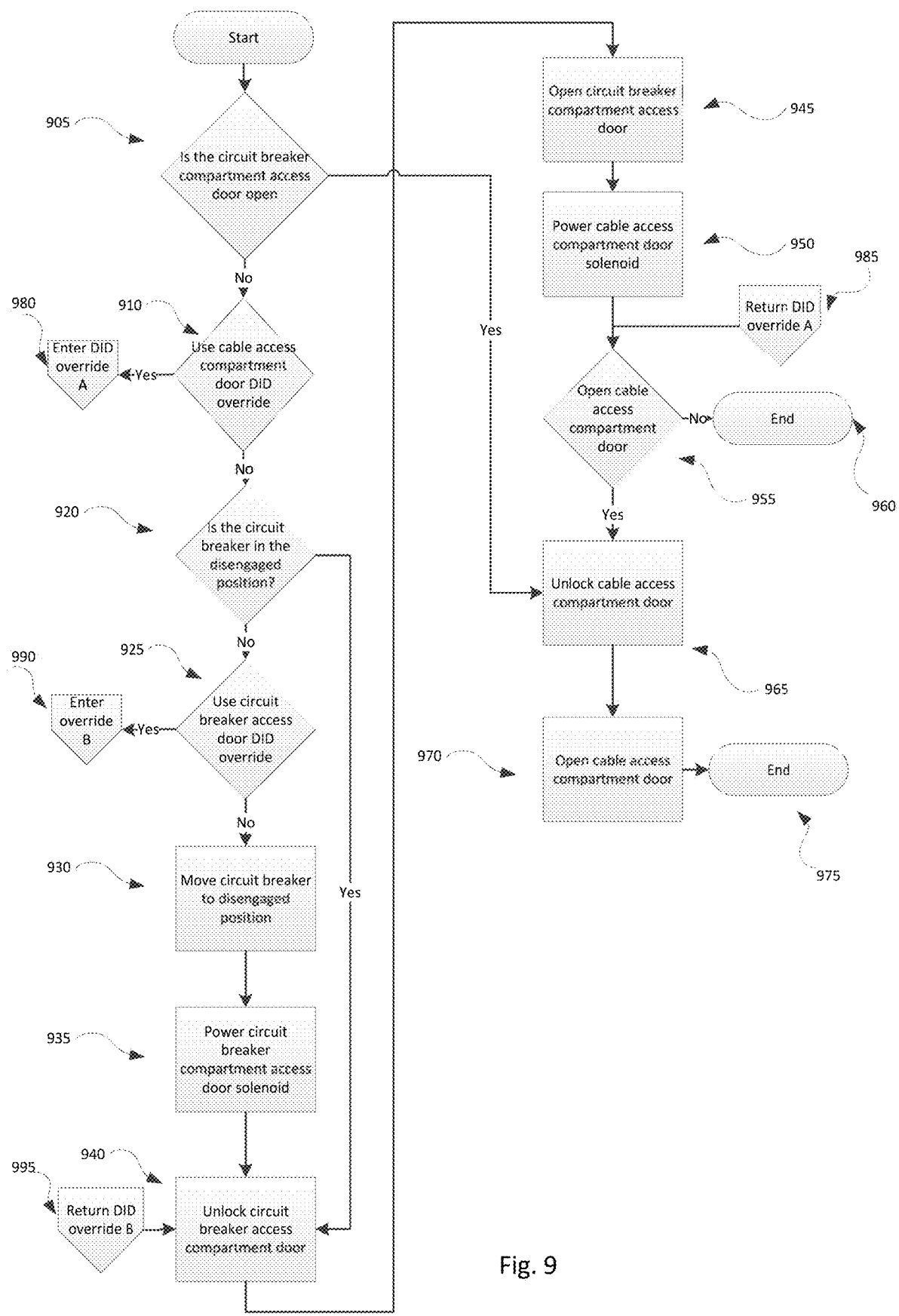

FIG. 9 is a flow chart illustrating the logic of the DID to open a door.

Figure 10:
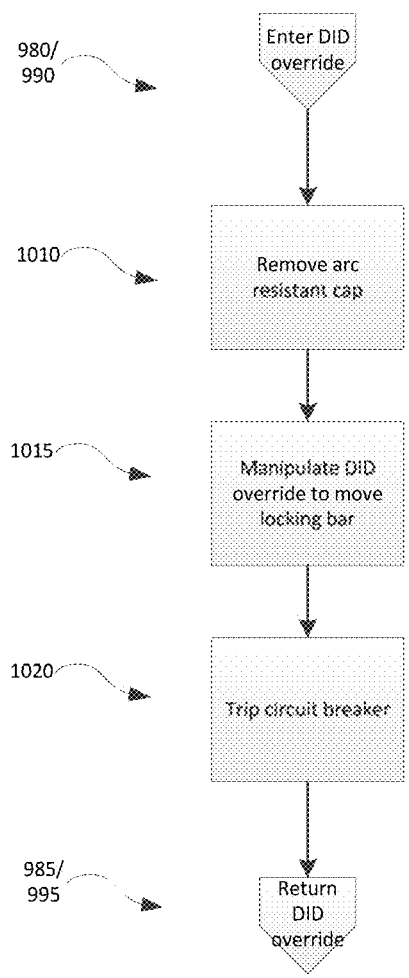

FIG. 10 is a flow chart illustrating the logic of the DID to use the DID override 210 to open a door.

FIG. 11a is an external view of a CBDL door 1100.

Figure 11B:
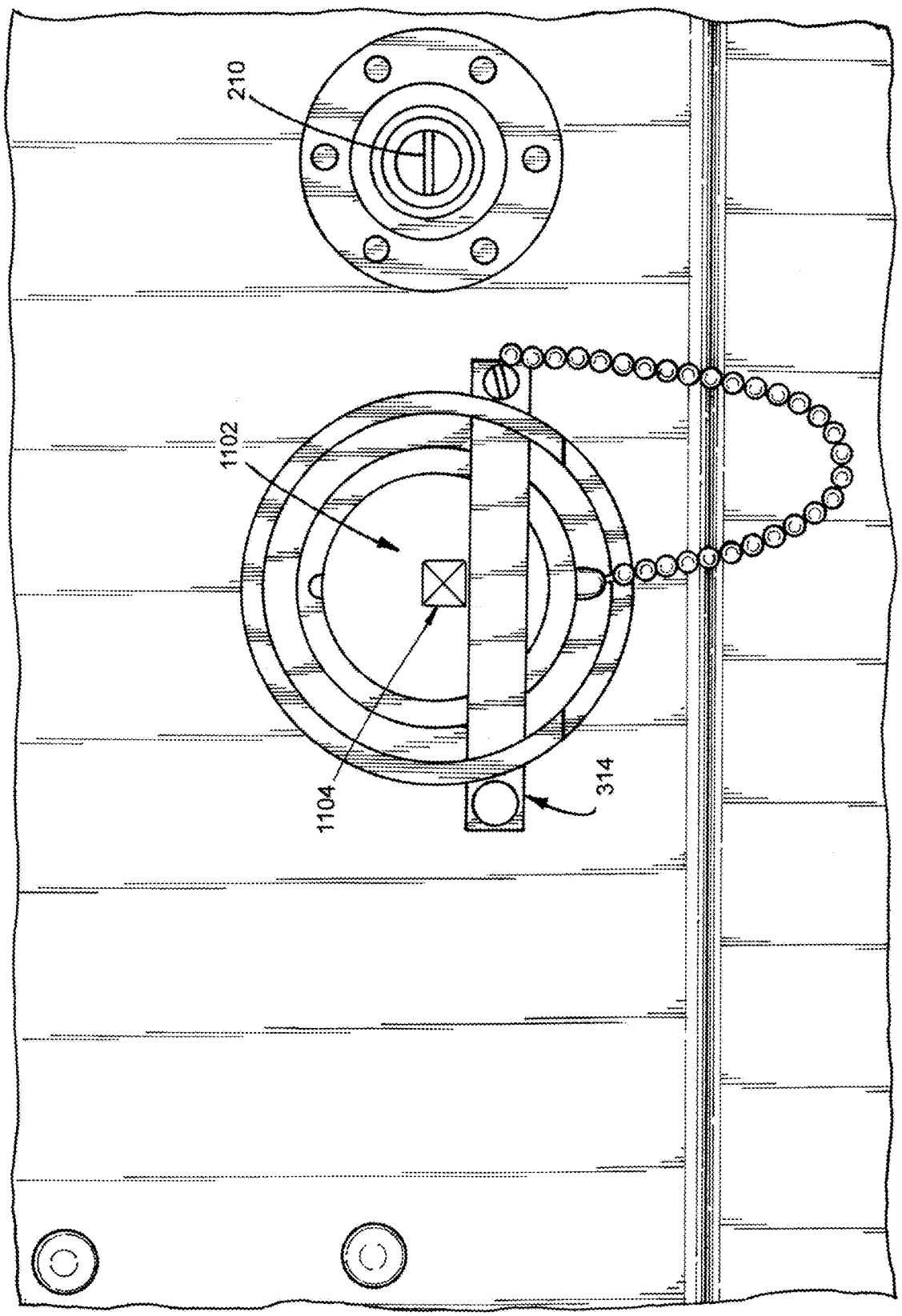

FIG. 11b is a view of an external section of a CBDL door 1100 with the manipulator shutdown switch 1102 with a switch restrictor 314 in an alternative exemplary embodiment.

Figure 1B:
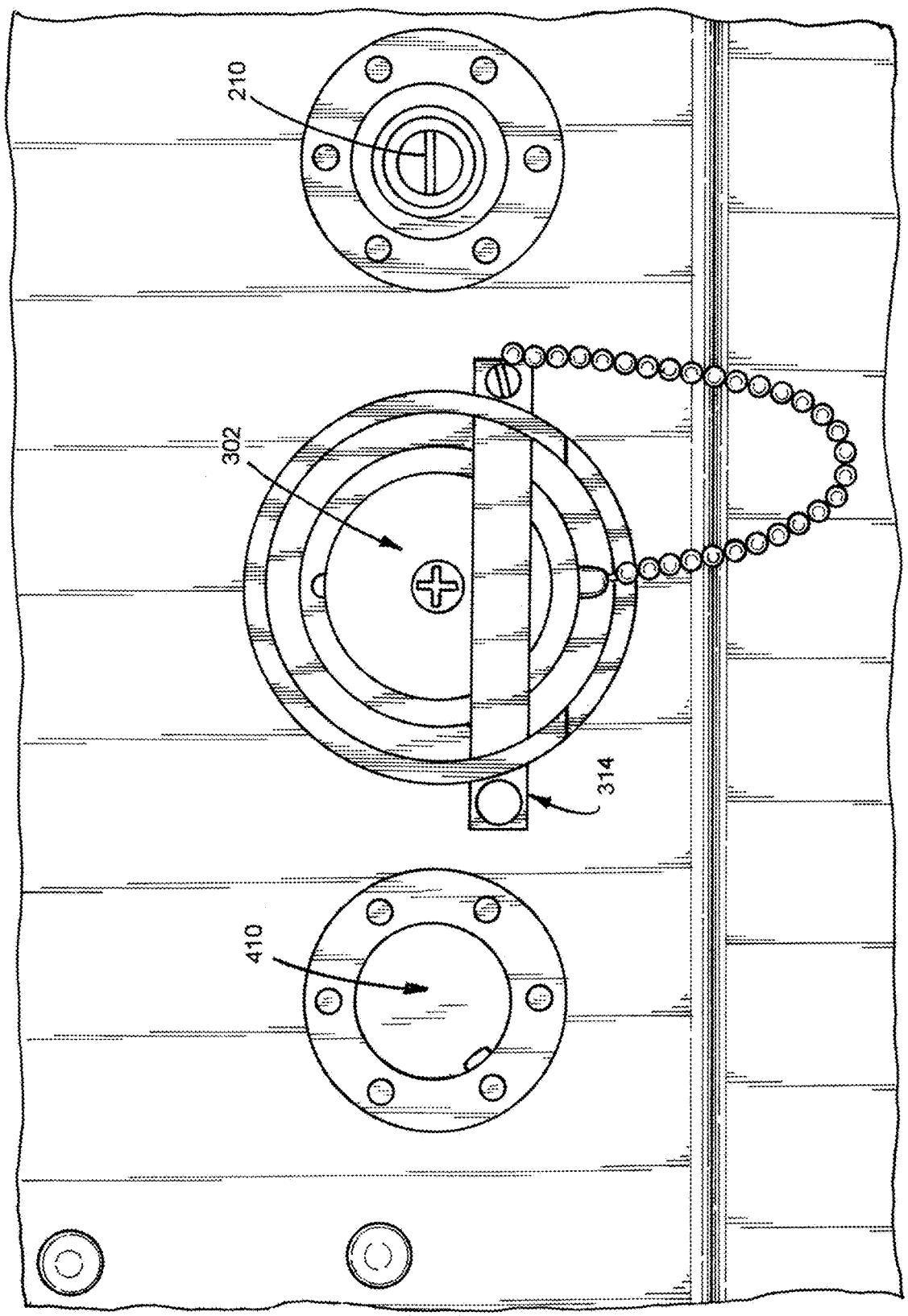
Figure 1D:
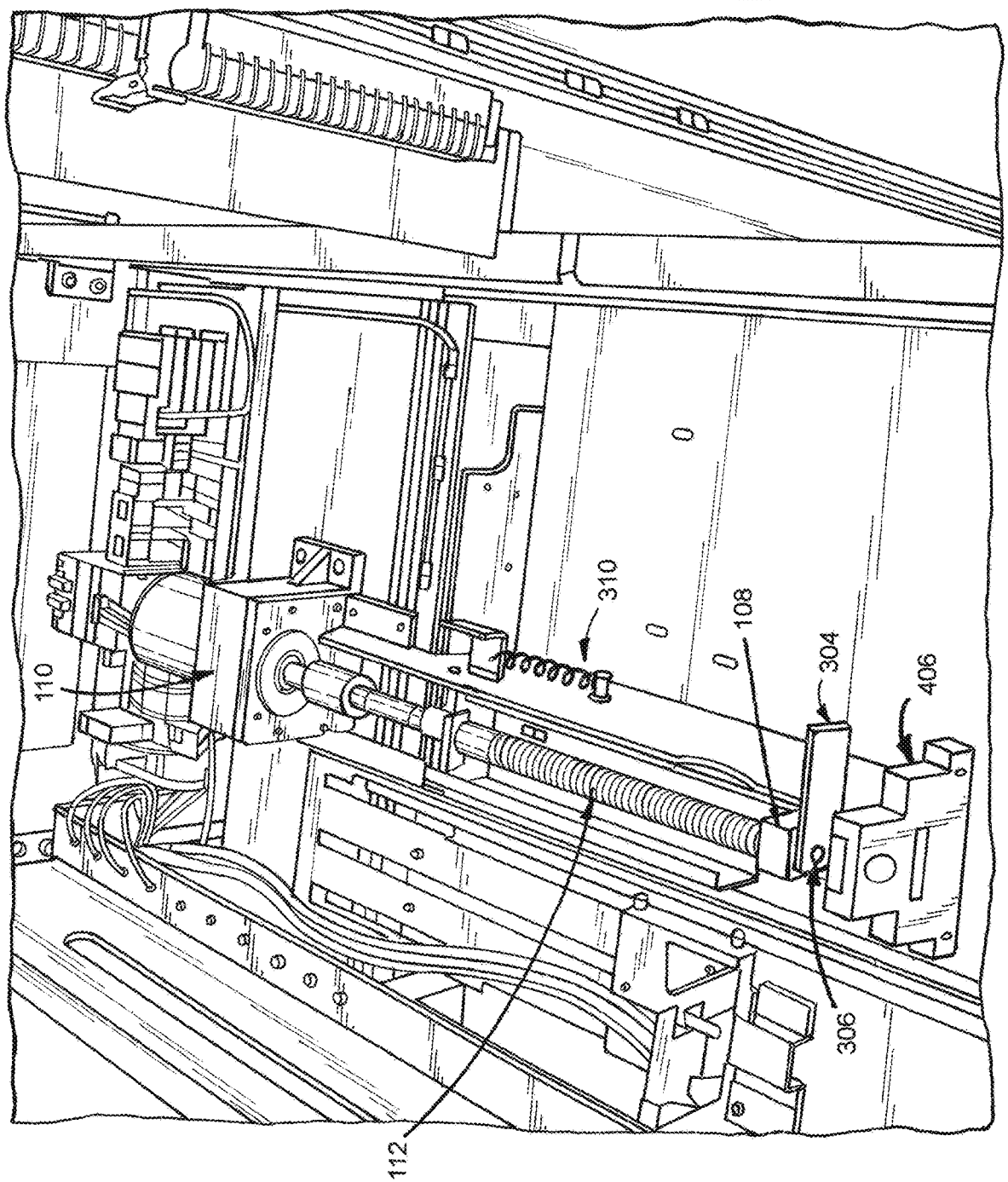
Figure 11C:
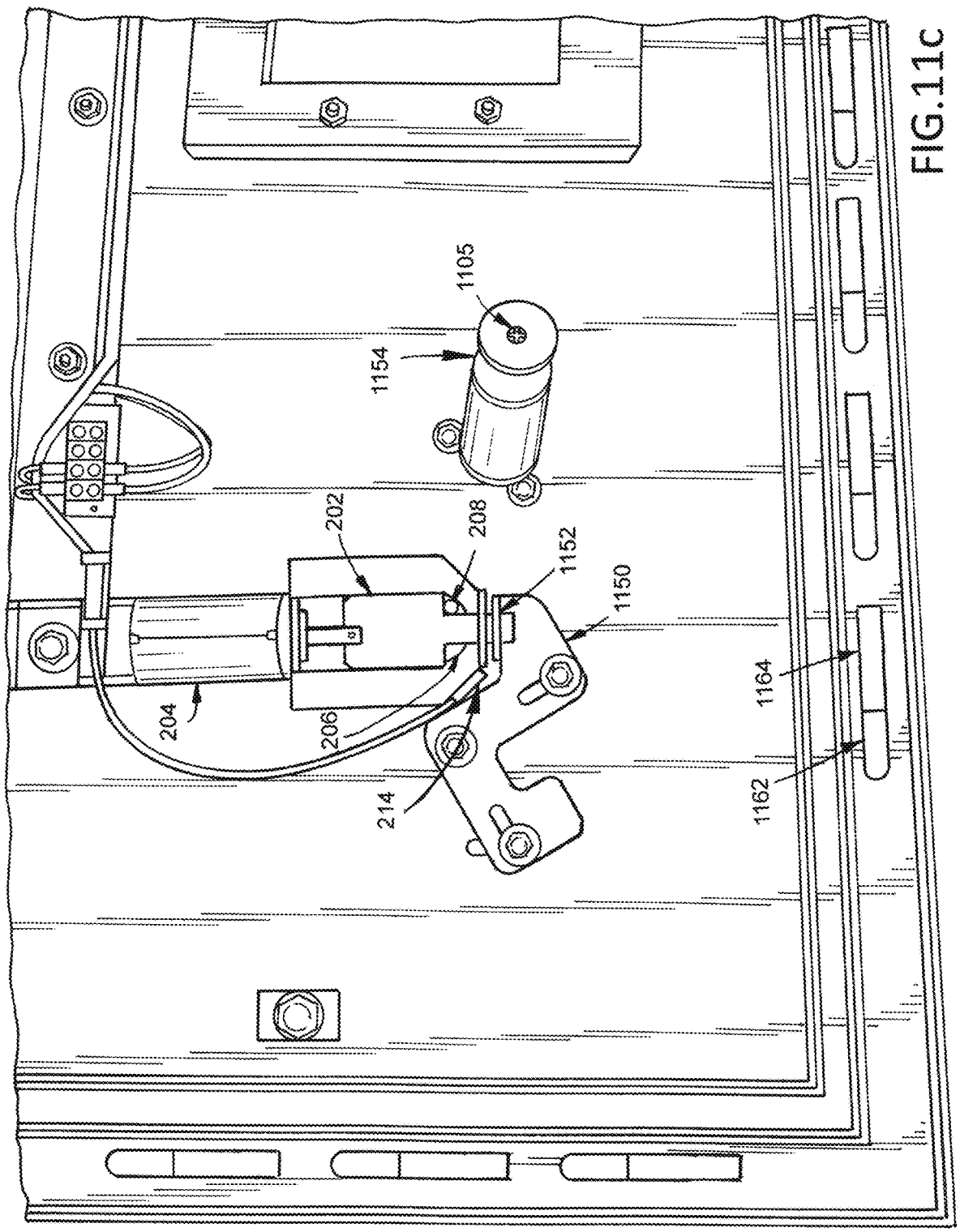

FIG. 11c is an internal view of a section of a CBDL door 1100 that corresponds to the elements show in FIG. 1b where the boomerang latch 1150 is in an engaged position from the locking bar 202.

FIG. 11d is an internal view of a section of a CBDL door 1100 that corresponds to the elements show in FIG. 11b where the boomerang latch 1150 is in a disengaged position from the locking bar 202.

Figure 11E:
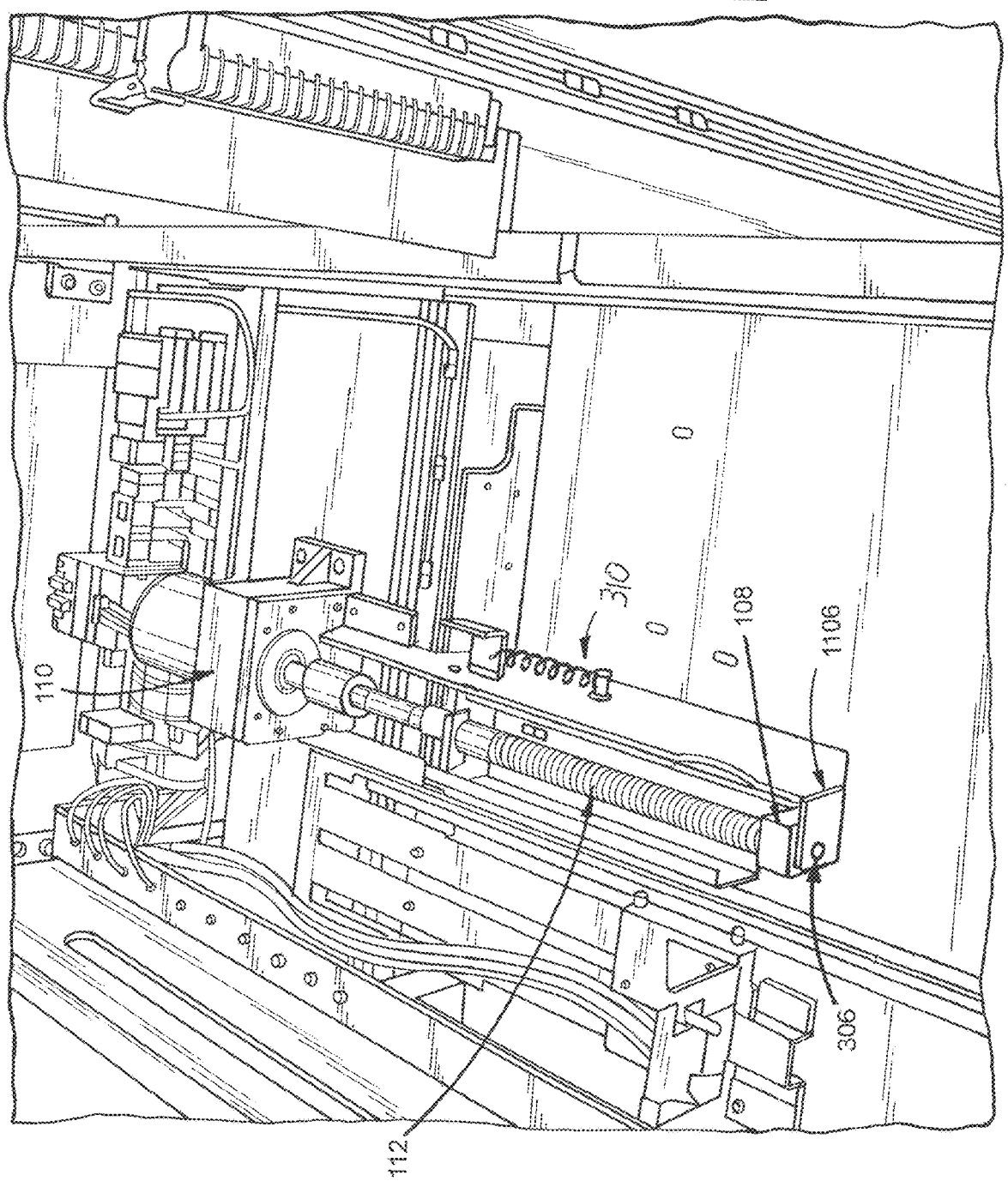

FIG. 11e is an internal view of the mechanism at the base of the switchgear 500 in an alternative exemplary embodiment with the mechanical gateway removed and the strike plate 1106 size changed.

Figure 12A:
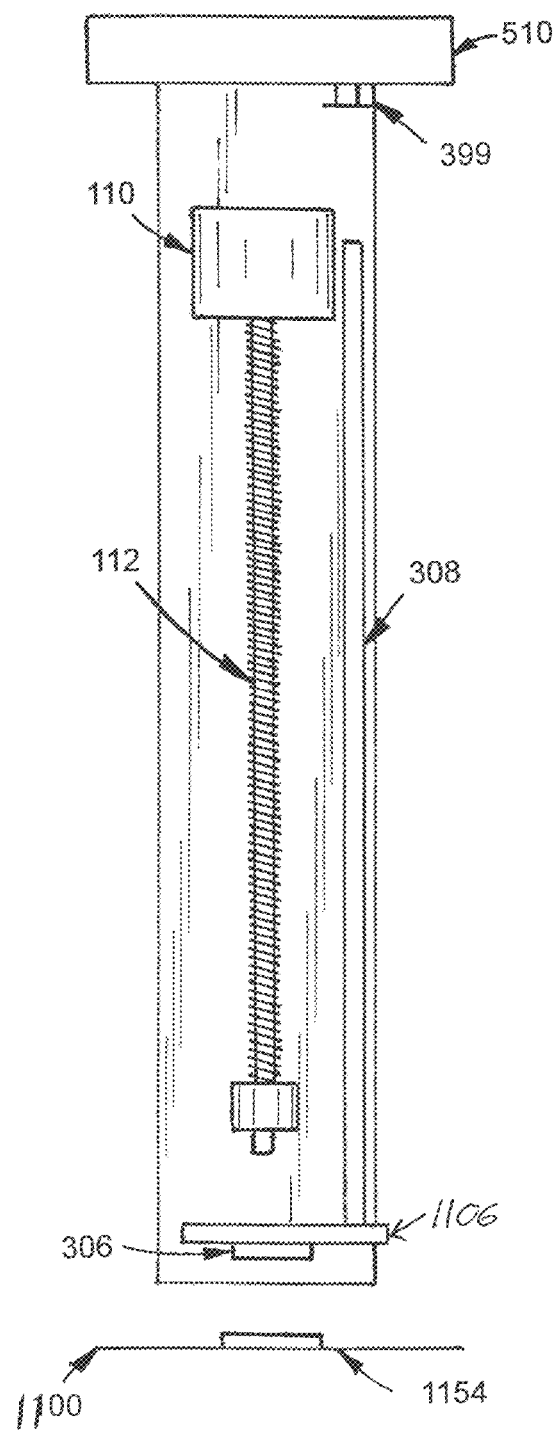

FIG. 12a is a view of the ARM 1101 inside a switchgear 500 in a non-tripped state in an exemplary embodiment.

Figure 12B:
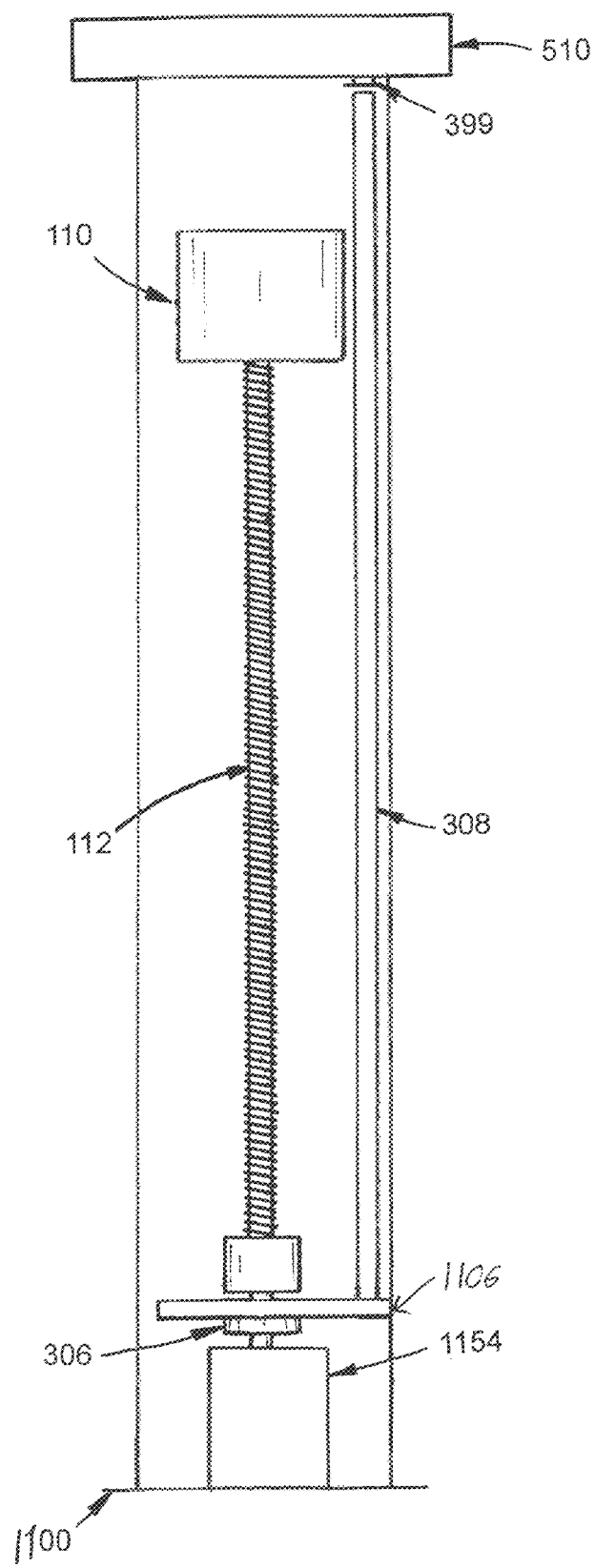

FIG. 12b is a view of the ARM 1101 inside a switchgear 500 in a tripped state in an exemplary embodiment.

FIG. 13a is a view of the ARM 1101 inside a switchgear 500 with the decoupler 308 in a non-tripped position with the worm gear 112 omitted.

FIG. 13b is a view of the ARM 1101 inside a switchgear 500 with the decoupler 308 in a tripped position and acting on the circuit breaker 510 with the worm gear 112 omitted.

Figure 14A:
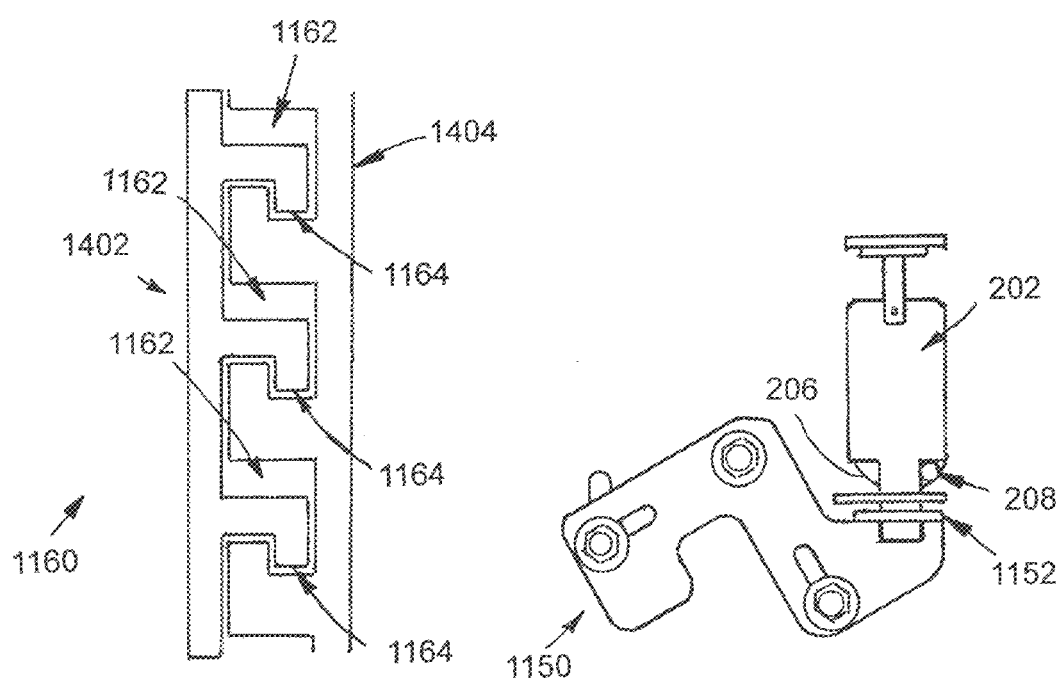

FIG. 14a is a side by side view of the latching mechanism 1160 and boomerang latch 1150 when the CBDL door 1100 is locked in in an exemplary embodiment.

Figure 14B:
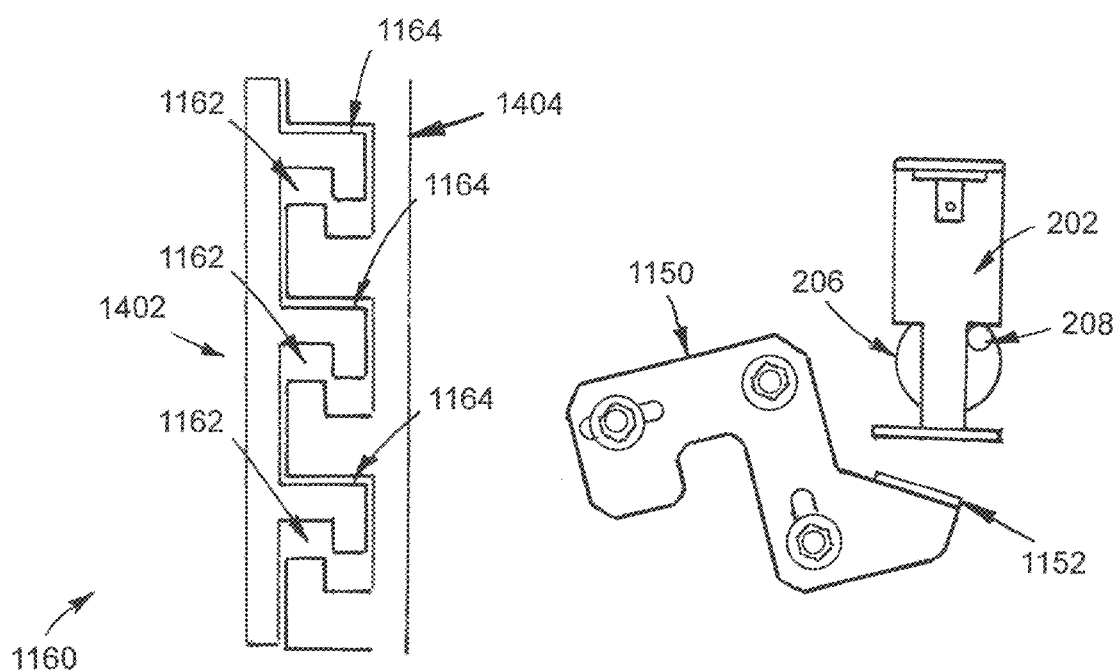

FIG. 14b is a side by side view of the latching mechanism 1160 and boomerang latch 1150 when the CBDL door 1100 is unlocked in in an exemplary embodiment.

Figure 15A:
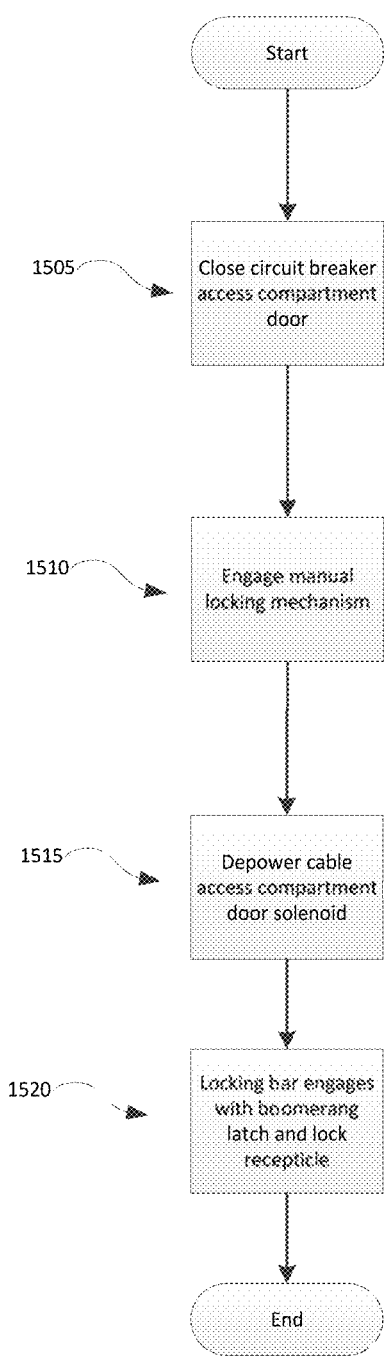

FIG. 15a is a flow chart illustrating the logic of the CBDL to secure the door.

Figure 15B:
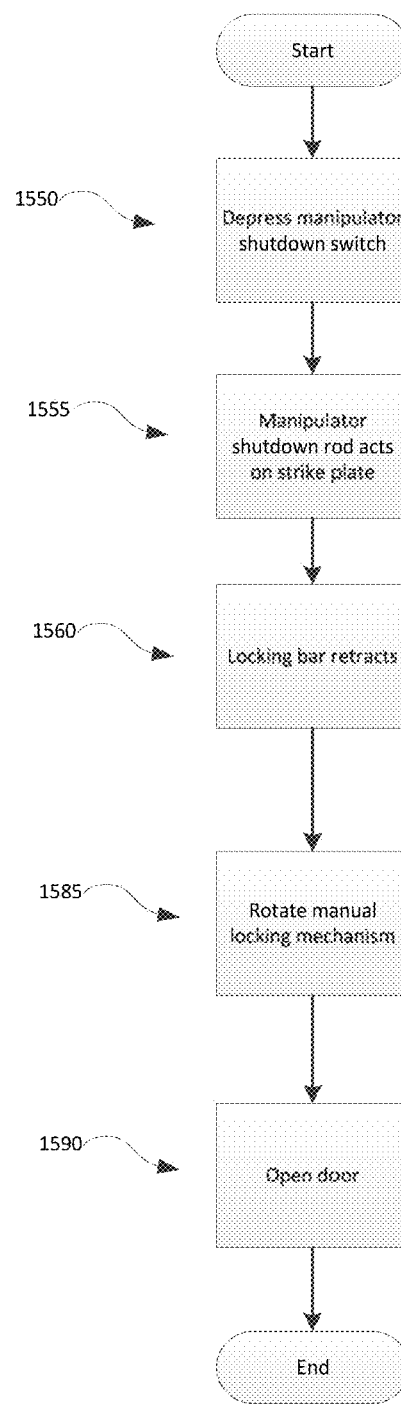

FIG. 15b is a flow chart illustrating the logic of the CBDL to release the door.

Figure 16:
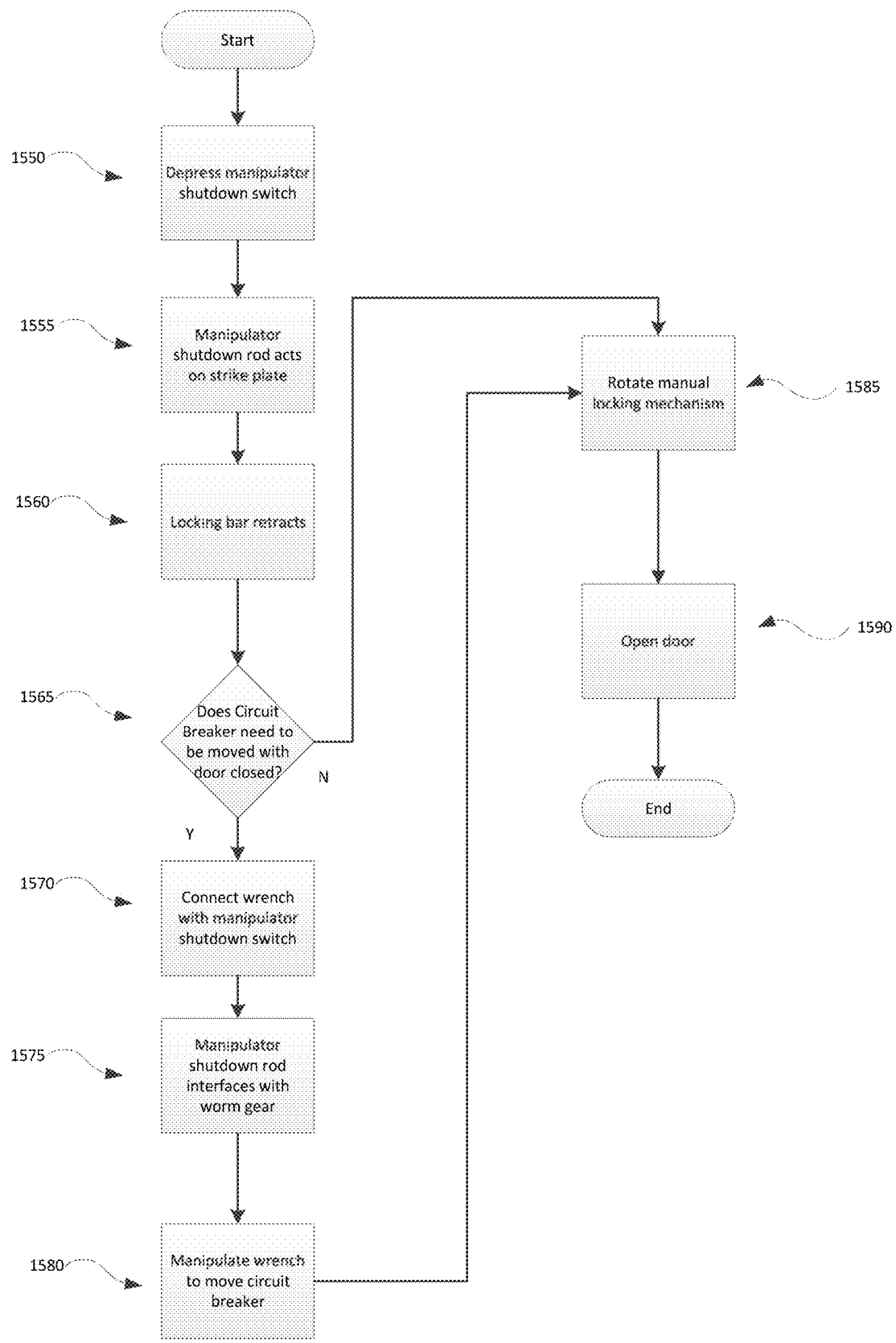

FIG. 16 is a flow chart illustrating the logic of the CBDL to release the door with the option to move the circuit breaker 510 before opening the door.

Figure 17A:
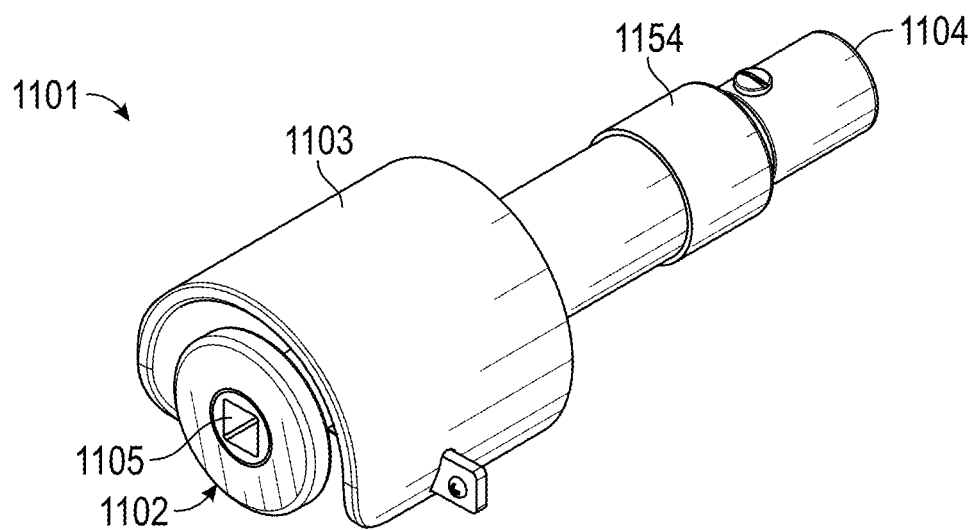

FIG. 17a is an isometric view of an ARM 1101.

Figure 17B:
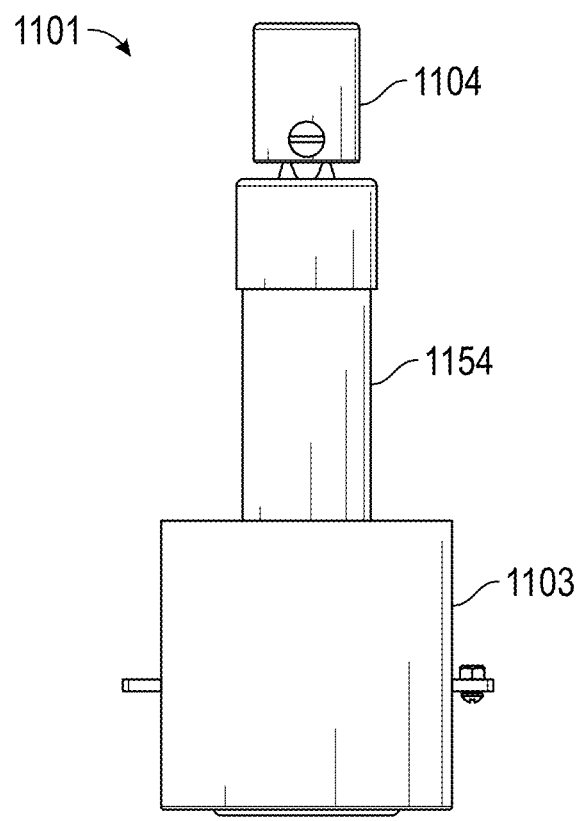

FIG. 17b is a top down view of the ARM 1101 from FIG. 17a.

FIG. 17c is a view of the ARM 1101 from FIG. 17a facing the manipulator shutdown switch 1102.

FIG. 17d is a view of the ARM 1101 from FIG. 17a facing the socket 1105.

FIG. 17e is a view of the ARM 1101 from FIG. 17a in the non-tripped position.

FIG. 17f is a view of the ARM 1101 from FIG. 17a in the tripped position.

DETAILED DESCRIPTION OF EXEMPLARY EMBODIMENTS

The interior of the switchgear 500 in an exemplary embodiment can be divided into two compartments: the circuit breaker access compartment 502 and the cable access compartment 504. The circuit breaker access compartment 502 is the location where the circuit breaker 510 resides when installed in the switchgear 500. The cable access compartment 504 is where the circuit breaker 510 interacts with the cables used for electrical power input and output. Dividing these two sections is a partition 508 that has two rows of three cylindrical apertures 514. The location of these cylindrical apertures 514 in the partition 508 corresponds to the connectors 512 from the circuit breaker 510. When the circuit breaker 510 is fully engaged as shown in FIG. 6b, the connectors 512 are inserted within these cylindrical apertures 514 to couple to the electrical power inputs and outputs in the cable access compartment 504. The cable access compartment door 702 is on the opposite side of the switchgear 500 from the circuit breaker access compartment door 100 in the exemplary embodiment and is used to access the power inputs and outputs for the switchgear 500.

The circuit breaker access compartment door 100 has a series of gauges and devices used by the operator to interact with the circuit breaker 510 within the switchgear 500 along with a manual locking mechanism 106. In the exemplary embodiment, the circuit breaker access compartment door 100 has a DID override 210, a MT/L switch button 302, and a mechanical access outer aperture 410. The cable access compartment door 702 also contains DID override 210. The manual locking mechanism 106 controls the locking projections 1164 in the locking aperture 1162, which are in the open configuration in FIG. 1c.

The casing of the switchgear 500, consisting of the doors and the enclosure 708, is arc resistant. The DID override 210 and the mechanical access outer aperture 410 are covered with an arc resistant cap 102 when not in use. Additionally, in the event of an overpressure within the switchgear 500, a series of vents 704 will open in the top surface of the switchgear 500, directing the force upward away from the operators.

The switchgear 500 has a racking device 108 where the circuit breaker 510 rests on the interior floor of the switchgear 500. The racking device 108 moves the circuit breaker 510 from the installation position to the engaged position by operation of a worm gear 112 acted on by the racking motor 110. When the racking device 108 is in the installation position shown in FIG. 6a, the circuit breaker 510 may be installed. The worm gear 112 then moves the circuit breaker 510 into the engaged position shown in FIG. 6b. The openings to the cylindrical apertures 514 are guarded by a series of louvers. As the racking device 108 moves the circuit breaker 510 into the engaged position, the louvers are opened, allowing the connectors 512 to pass through the cylindrical apertures 514 to couple with the power input and power output.

The cable access compartment 504 may be designed to receive power inputs and power outputs as needed. Additionally, the switchgear 500 may be connected with other switchgears via couplers 706 located on the sides of the switchgear 500. Other features for the switchgear 500 include a control mechanism capable of receiving remote commands to disconnect the circuit breaker 510. Such control mechanisms may be by any means known to those skilled in the art.

The disclosed invention contains elements that work individually and in concert to prevent operators from accessing the circuit breaker 510 unless it is disengaged.

It is further understood that the disclosed invention may be practiced on an existing switchgear 500. Such modifications would require minimal installation of equipment and physical modification of the switchgear 500. Further, this disclosed modification components could be provided as a kit, where all elements necessary to practice the invention would be provided.

Door Interlock Device (DID)

The DID is a locking system that restricts when the circuit breaker access compartment door 100 and the cable access compartment door 702 may be opened. The DID utilizes a series of sensors 214 that provide input to a logic device, such as a primary logic circuit (PLC). In an exemplary embodiment, there are two sensors 214 for the circuit breaker access compartment door 100 and two sensors 214 for the cable access compartment door 702. One sensor 214 determines when a door is closed. A second sensor 214 determines when the manual locking mechanism 106 has been engaged for the same door. The inputs from these sensors 214 goes into the logic circuit which determines the status of the DID in an exemplary embodiment.

Figure 2C:
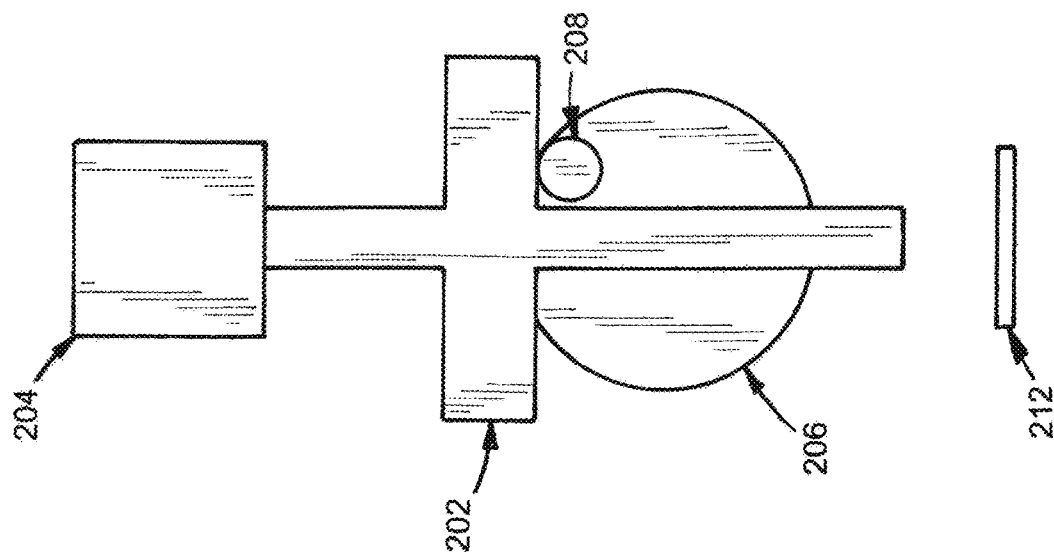
FIG. 2c is a view of the DID in an override state in an exemplary embodiment.
Figure 2B:
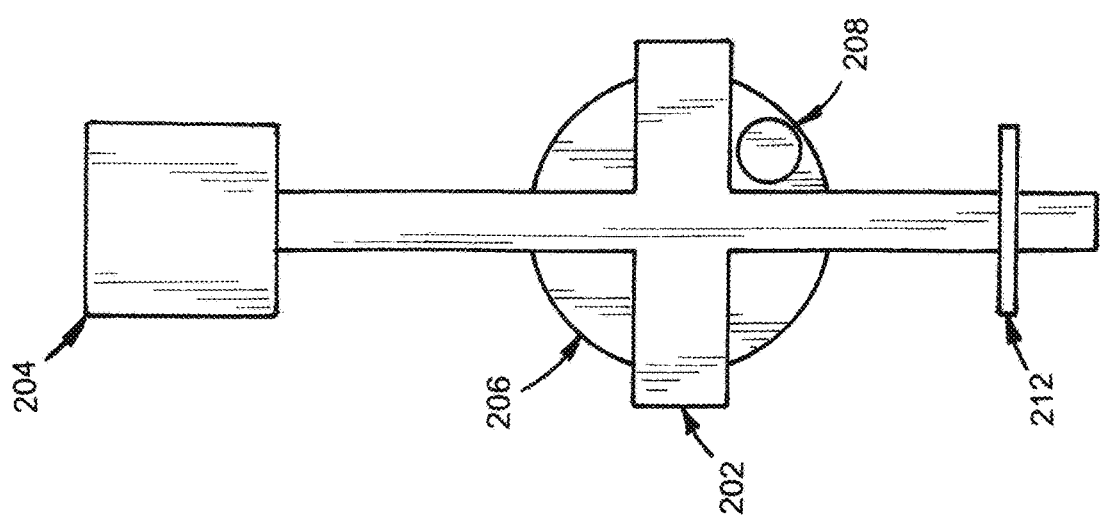
FIG. 2b is a view of the DID in a locked state in an exemplary embodiment.
Figure 2A:
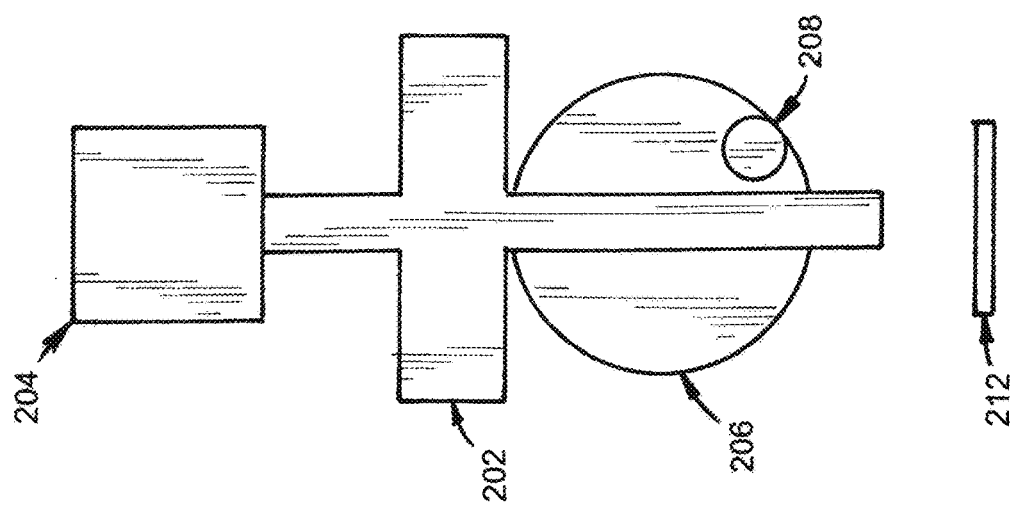
FIG. 2a is a view of the DID in an unlocked state in an exemplary embodiment.

The DID uses a locking element, a deployment device, and a retraction device. In the exemplary embodiment, the DID comprises a locking bar 202 for the locking device, a lock spring for the deployment device, and a solenoid for a retraction device. The lock spring and the solenoid are contained in the spring/solenoid assembly 204. When the logic device determines that certain conditions are met, the solenoid in the spring/solenoid assembly 204 may receive power to unlock the door as shown in FIG. 2a. When the logic device determines that other conditions are present, or if it loses power, the solenoid in the spring/solenoid assembly 204 deactivates, and a lock spring forces the locking bar 202 into a lock receptacle 212 inside the switchgear 500 as opposed to the circuit breaker compartment access door 100, preventing the associated door from opening as shown in FIG. 2b. FIG. 2c illustrates how the locking bar 202 may be manipulated by use of a DID override 210 that will be explained below.

The DID operates once the circuit breaker 510 is installed in the switchgear 500. The process is illustrated in FIG. 8 with both the cable access compartment door 702 open and the circuit breaker access compartment door 100 initially open. The open cable access compartment door 702 facilitates the coupling of the switchgear 500 to the applicable electrical system. The process begins when the cable access compartment door 702 is closed (step 805), tripping the first cable access compartment door sensor. The locking of the cable access compartment door 702 via the manual locking mechanism 106 of the cable access compartment door 702 (step 810) trips the second cable access compartment door sensor. The circuit breaker 510 is coupled to the racking device 108 that can move the circuit breaker 510 from an installation position to a test position to an engaged position. The circuit breaker access compartment door 100 is closed (step 815), and this closure is detected by the first circuit breaker access compartment door sensor. The cable access compartment door 702 solenoid now depowered (step 820), causing the spring in the spring/solenoid assembly 204 to push the locking bar 202 into the lock receptacle 212 locking the cable access compartment door 702. The locking of the circuit breaker access compartment door 100 (step 825) by the manual locking mechanism 106 trips the second circuit breaker access compartment door sensor.

Once both of the sensors 214 for the circuit breaker access compartment door 100 indicate closed, the circuit breaker 510 may be moved to an engaged position (step 830). If the operator does not wish to engage the circuit breaker 510, then the process concludes (step 845).

If the operator wants the circuit breaker 510 to engage (step 830) then the circuit breaker 510 is moved into the engaged position (step 835). The circuit breaker 510 begins in the disengaged position as shown in FIG. 6a. Once the circuit breaker 510 has left the disengaged position, the circuit breaker access compartment door 100 solenoid is now depowered (step 840), causing the spring in the spring/solenoid assembly 204 to push the locking bar 202 into the lock receptacle 212, locking the circuit breaker access compartment door 100. The process then concludes (step 850). The circuit breaker 510 is now engaged as shown in FIG. 6b. The switchgear 500 will remain locked until the logic circuit energizes the solenoids or a DID override 210 is used.

A circuit breaker sensor 214 monitors the location of the circuit breaker 510 within the switchgear 500. The logic device will not allow a circuit breaker access compartment door 100 to open unless the circuit breaker 510 is in a disengaged position. Concurrently, the logic device will not allow the cable access compartment door 702 to open unless the circuit breaker access compartment door 100 is open in an exemplary embodiment.

FIG. 9 is an illustrative flowchart showing an exemplary embodiment of how the logic may be set up to open all doors once the DID is engaged for both doors. If an operator wants to open the cable access compartment door 702 locked by the DID, then he would see if the circuit breaker access compartment door 100 was open (step 905). If the circuit breaker access compartment door 100 is open, then the cable access compartment door 702 may be unlocked (step 965) and opened (step 970), ending the process (step 975). If the circuit breaker access compartment door 100 is not open, then the operator decides whether or not to use the DID override 210 on the cable access compartment door 702 (step 910). If he chooses not to use the DID override 210, then the logic circuit determines if the circuit breaker 510 is in the disengaged position (step 920). If the circuit breaker 510 is not in a disengaged position, the operator would decide whether or not to use the circuit breaker access door DID override 210 (step 925). If he chose not to us the DID override 210, then the circuit breaker 510 needs to he moved to a disengaged position (step 930). Once the circuit breaker 510 is in the disengaged position, the solenoid for the spring/solenoid assembly 204 for the circuit breaker access compartment door 100 will power up, and the locking bar 202 will retract from the lock receptacle 212 (step 935). The circuit breaker access compartment door 100 may be unlocked (step 940) and opened (step 945). Opening the circuit breaker access compartment door 100 triggers the logic circuit to power the solenoid in the spring/solenoid assembly 204 for the cable access compartment door 702 (step 950). The operator can the choose if wants to open the cable access compartment door 702 (step 955) to then unlock (step 965) and open (step 970) the cable access compartment door 702. Alternatively, if the circuit breaker 510 was already in a disengaged position (step 920), then multiple steps may be bypassed and proceed to unlocking the circuit breaker access compartment door 100 (step 940) and proceeding as previously disclosed.

If the DID override 210 is used to open either the circuit breaker access compartment door 100 or the cable access compartment door 702, then the applicable sensor 214 will indicate that the doors are not secured. In an exemplary embodiment, the PLC will electronically trip the circuit breaker 510 to return it to a non-powered state.

Different scenarios require different paths through the logic of the DID. In the event that the operator only wanted to open the circuit breaker access compartment door 100, then the process would begin by determining if the circuit breaker 510 was in the disengaged position (step 920). The logic would proceed as in the above disclosed exemplary embodiment.

In the exemplary embodiments, when either the cable access compartment door 702 or the circuit breaker access compartment door 100 needs to be opened, and the logic device prevents this due to its programming or due to a lack of power to energize the solenoids as shown in FIG. 2b, a DID override 210 is available. In the exemplary embodiment, there is a DID override 210 on both the circuit breaker access compartment door 100 and the cable access compartment door 702. The DID override 210 is covered with an arc resistant cap 102, making it part of the arc resistant surface 104 of the switchgear 500. An operator would remove the arc resistant cap 102 (step 1010). Once the arc resistant cap 102 is removed, the DID override 210 is exposed. Using a specially designed tool to interface with the DID override 210, the locking bar 202 may be retracted from the lock receptacle 212 (step 1015). In an exemplary embodiment, the rotation of the DID override 210 rotates the cam 206 with the knob 208 located adjacent the locking bar 202. When the knob 208 moves, it exerts force on the locking bar 202 that pushes the locking bar 202 against the force of the lock spring in the spring/solenoid assembly 204, removing the locking bar 202 from the lock receptacle 212 as shown in FIG. 2c. The result is the locking bar 202 no longer locks the associated door, allowing the door to be opened by operating the manual locking mechanism 106. The action also trips the circuit breaker 510 (step 1020) in the exemplary embodiment to prevent power flow when opening the applicable door.

The use of the DID override 210 in the exemplary embodiment allows the logic circuit to be bypassed from previous exemplary embodiment in this disclosure. It an operator wants to open the cable access compartment door 702 and chooses to use the DID override 210 (step 980), then the operator removes the arc resistant cap 102 (step 1010) and manipulates the DID override 210 to move the locking bar 202 to act against the spring in the spring/solenoid assembly 204 (step 1015). The circuit breaker 510 is now tripped (step 1020). The operator then leaves the DID override 210 (step 985). The operator may choose to unlock the cable access compartment door 702 (step 955) as previously disclosed.

If an operator wants to open the circuit breaker access compartment door 100 and chooses to use the DID override 210 (step 990), then the operator removes the arc resistant cap 102 (step 1010) and manipulates the DID override 210 to move the locking bar 202 to act against the spring in the spring/solenoid assembly 204 (step 1015). The circuit breaker 510 is now tripped (step 1020). The operator then leaves the DID override 210 (step 995). The operator may unlock (step 940) and open (step 945) the circuit breaker access compartment door 100. Additionally, with the circuit breaker access compartment door 100 opened, the spring/solenoid assembly 204 on the cable access compartment door 702 may be powered (step 950). The operator may choose to open the cable access compartment door 702 (step 955). This allows the cable access compartment door to be unlocked (step 965) and opened (step 970). Alternatively, the operator may choose not to open the cable access compartment door 702, ending the process (step 960).

Mechanical Trip and Lockout (MT/L)

Figure 4A:
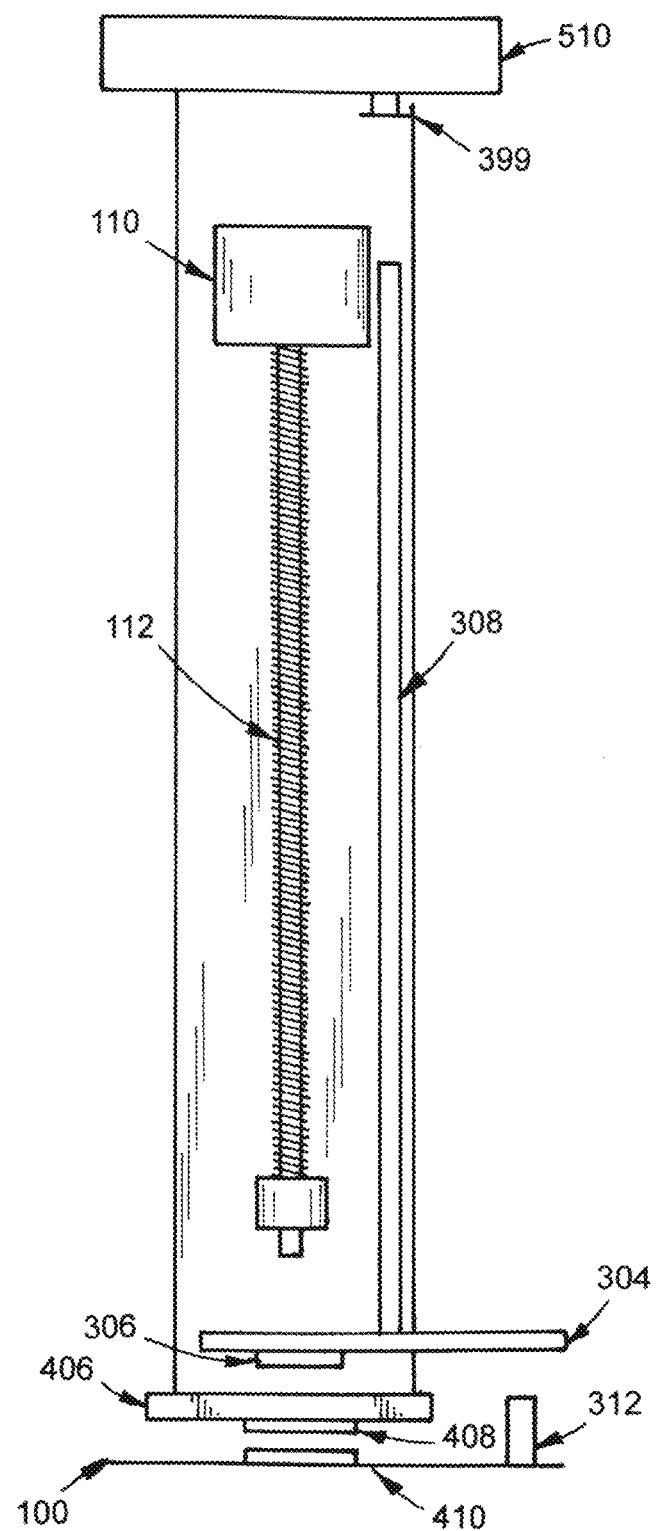
FIG. 4a is a view of the MT/L integrated with a MRHED in a non-tripped state in an exemplary embodiment.
Figure 4B:
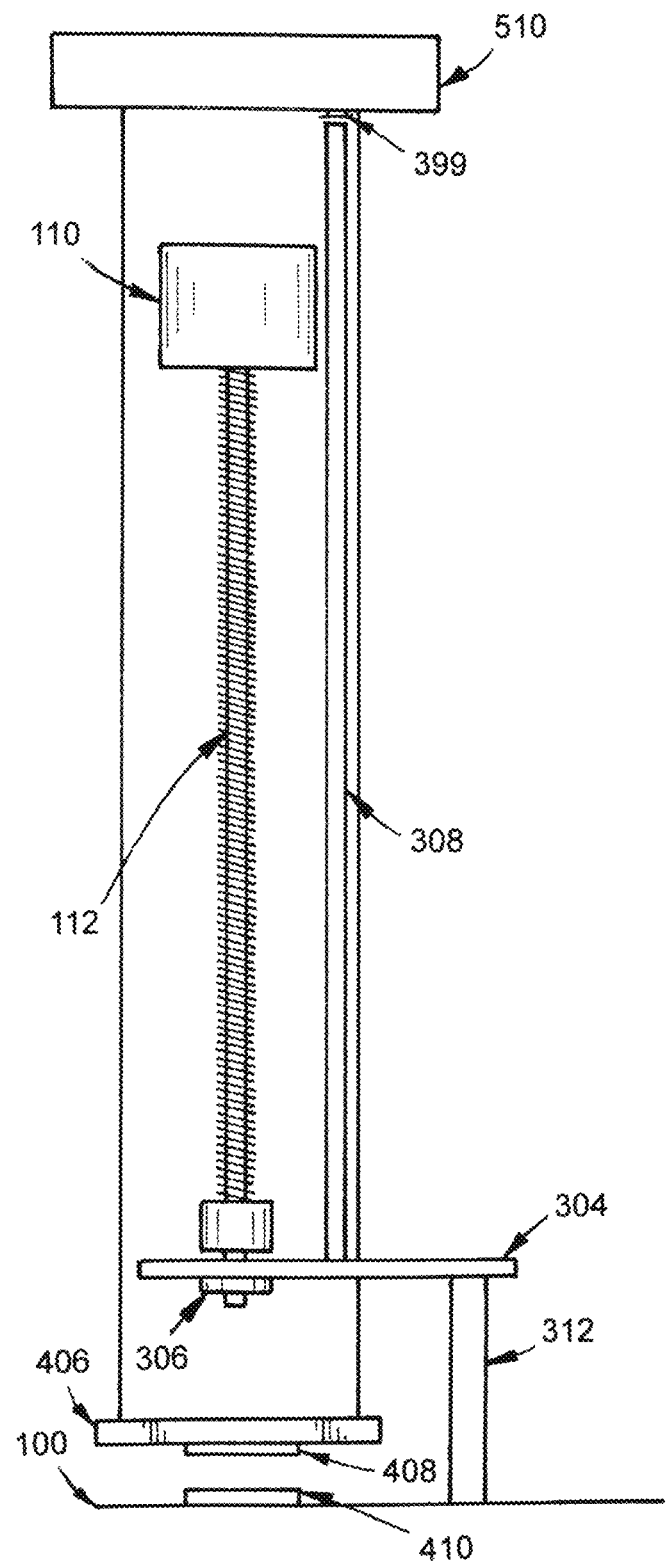
FIG. 4b is a view of the MT/L integrated with a MRHED in a tripped state in an exemplary embodiment.

The MT/L is a circuit breaker trip device than comprises a MT/L switch, a strike plate 304, and the decoupler 308. The MT/L switch comprises a spring loaded MT/L switch button 302 and a rod 312 operated by the spring loaded MT/L switch button 302. The MT/L switch button 302 extends from the outer surface of the circuit breaker access compartment door 100. The MT/L switch button 302 is in communication with the rod 312, which extends from the inner surface of the circuit breaker access compartment door 100. The rod 312 is normally in a retracted position as show in FIGS. 4a and 5a. When the MT/L switch button 302 is depressed, the rod 312 acts on a strike plate 304. Coupled to the strike pate is a decoupler 308. The decoupler 308 in the exemplary embodiment is a projection that lines up with an external tripping mechanism 399 of an engaged circuit breaker 510. When the rod 312 acts on the strike plate 304, the strike plate 304 then moves away from the circuit breaker access compartment door 100, and the decoupler 308 is pushed back as shown in FIGS. 4b and 5b. The decoupler 308 then makes contact with the circuit breaker external tripping mechanism 399, deactivating the circuit breaker 510. The decoupler 308 further comprises a mechanism to return the decoupler 308 back to its disengaged position when the MT/L switch button 302 is not depressed. In the exemplary embodiment, the mechanism is a decoupler spring 310.

Once the circuit breaker external tripping mechanism 399 has engaged, the circuit breaker 510 will remain disengaged unless it is reactivated by a means known to those skilled in the art. The MT/L has an additional option where the cover for the MT/L switch button 302 may further include a mechanism to keep the MT/L switch button 302 in the depressed position. In the exemplary embodiment, the mechanism is a switch restrictor 314.

The MRHED is a mechanism that restricts manual operation of an element within the switchgear 500. In an exemplary embodiment, the MRHED allows manual operation of the worm gear 112 to move the racking device 108 only when the circuit breaker access compartment door 100 is closed. When an operator wants to have the circuit breaker 510 moved to a disengaged position, the operator may use a mechanical ratchet to manipulate the worm gear 112 to move the racking device 108, causing the circuit breaker 510 to decouple from the power inputs and power outputs. The MRHED operates in a manner that requires the circuit breaker access compartment door 100 to be closed when using the mechanical ratchet to move the circuit breaker racking device 108.

In the exemplary embodiment, the MRHED has components that are fixed to the interior of the circuit breaker access compartment 502 and components that are integrated into the inner surface of the circuit breaker access compartment door 100. The circuit breaker access compartment door 100 comprises a mechanical access outer aperture 410 and a tongue 402 that extends perpendicularly from the interior surface of the circuit breaker access compartment door 100. The mechanical access outer aperture 410 is covered with an arc resistant cap 102, maintaining the arc resistant integrity of the switchgear 500.

Figure 3A:
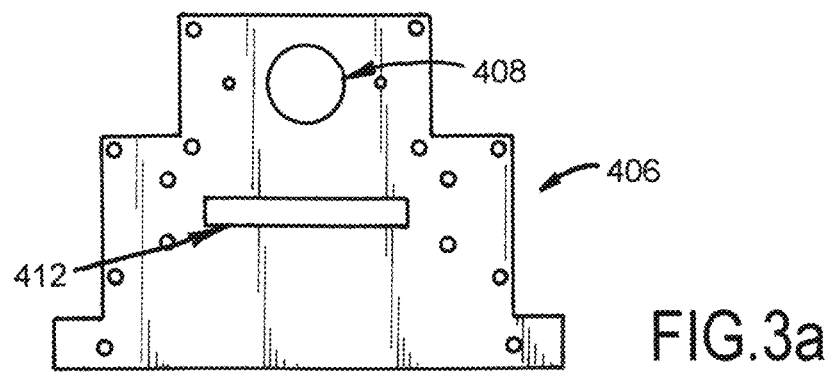
FIG. 3a is a view of a mechanical gateway 406 without any mechanical shutters 414 in an exemplary embodiment.
Figure 3B:
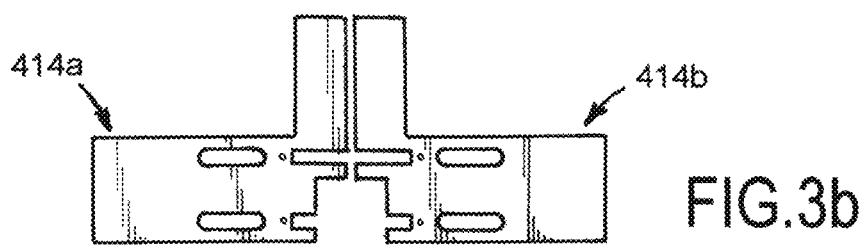
FIG. 3b is a view of the mechanical shutters 414 in an exemplary embodiment.

In the exemplary embodiment, a mechanical gateway 406 is positioned between the end of the worm gear 112 and the location of the mechanical access outer aperture 410 when the circuit breaker access compartment door 100 is closed. The mechanical gateway 406 comprises a mechanical access inner aperture 408, and a mechanical shutter interface 412 as shown in FIG. 3a. The mechanical gateway 406 has a set of mechanical shutters 414 shown in FIG. 3b that are used to open and close the mechanical gateway 406 in accordance with the exemplary embodiment.

Figure 3C:
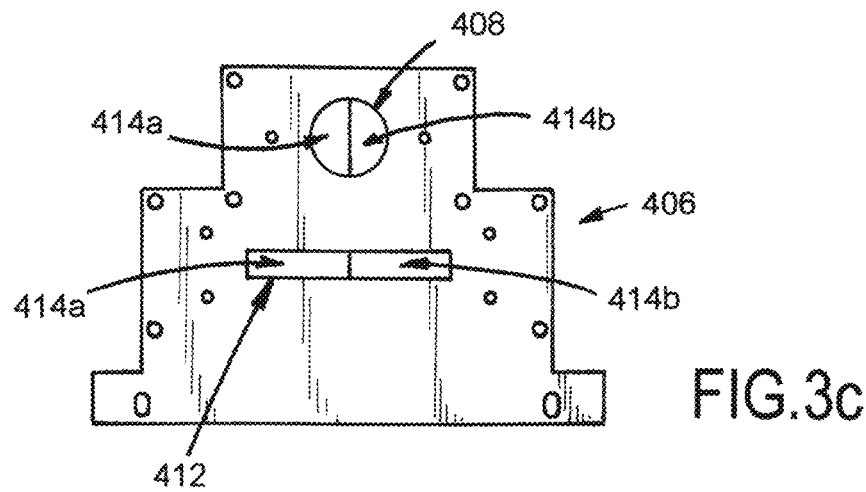
FIG. 3c is a view of a mechanical gateway 406 in a closed state in an exemplary embodiment.
Figure 3D:
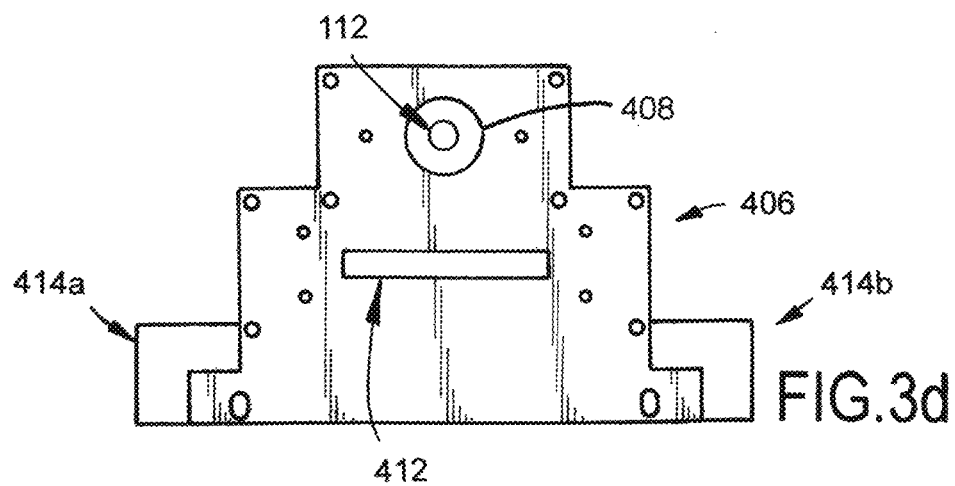
FIG. 3d is a view of a mechanical gateway 406 in an opened state in an exemplary embodiment.

In an exemplary embodiment, the mechanical access inner aperture 408 is closed as shown in FIG. 3c when the circuit breaker access compartment door 100 is open. When circuit breaker access compartment door 100 is closed, the tongue 402 enters the mechanical shutter interface 412 and forces the mechanical shutters 414 to separate, opening the mechanical access inner aperture 408 as shown in FIG. 3d. The arc resistant cap 102 may be removed, exposing the mechanical access outer aperture 410. With both the mechanical access outer aperture 410 and the mechanical access inner aperture 408 open, a mechanical ratchet may now interface with the worm gear 112 to manipulate the racking device 108.

In a further exemplary embodiment, the strike plate 304 of the previously discussed MT/L maybe modified to interface with the MRHED. In an exemplary embodiment, the strike plate 304 may contain a strike plate aperture 306 as shown in FIGS. 4a and 4b. The strike plate aperture 306 may be positioned to line up with the mechanical access outer aperture 410 and the mechanical access inner aperture 408. The strike plate 304 would not interfere with the manipulation of the worm gear 112 as the strike plate aperture 306 allows unobstructed access to the worm gear 112. The strike plate aperture 306 may be large enough for the worm gear 112 to pass through, but not wide enough for the head of the mechanical ratchet. By placing the mechanical ratchet in contact with the worm gear 112, the mechanical ratchet will push on the strike plate 304, activating the MT/L and tripping the circuit breaker 510 as shown in FIG. 4b. This exemplary embodiment would have the ratchet mimic the function of the rod 312 from the MT/L.

Circuit Breaker Door Lock (CBDL)

The CBDL shown in FIG. 11a-e restricts any movement of the latching mechanism 1160 with the circuit breaker 500 is engaged. The CBDL door 1100 does not require the mechanical access outer aperture 410 of the MRHED in the alternative exemplary embodiment as shown in FIG. 11a-b. The CBDL adds an additional level of safety by restricting the latching mechanism 1160.

The latching mechanism 1160 in the CBDL involves a set of locking projections 1164 mounted on a sliding bar 1402 that moves laterally and longitudinally to interface with locking apertures 1162 fixed on a locking bracket 1404 mounted in the switchgear 500. The manual locking mechanism 106 on the CBDL door 1100 controls the sliding bar 1402. When engaged, latching mechanism 1160 prevents the CBDL door 1100 from opening. When disengaged, the CBDL door 1100 may open absent other restrictions.

The manual locking mechanism 106 is also in communication with the boomerang latch 1150. The boomerang latch 1150 has a boomerang latch aperture 1152 that is dimensioned to accept the locking bar 202. When the manual locking mechanism 106 is in the open position, the boomerang latch aperture 1152 is not aligned with the locking bar 202 or the lock receptacle 212 as previously shown in FIGS. 2a-c.

When the CBDL door 1100 is closed and the manual locking mechanism 106 is in the closed position, the locking bar 202, lock receptacle 212, and boomerang latch aperture 1152 are in alignment. When the spring/solenoid assembly 204 is disengaged, the locking bar 202 then goes through the lock receptacle 212 and the boomerang latch aperture 1152, both preventing the CBDL door 1100 from opening and the manual locking mechanism 106 from moving. FIG. 11c shows how the CBLM in a locked configuration looks in the interior surface of the CBDL door 1100, while FIG. 14a shows the embodiment with the boomerang latch 1150 and the locking bar 202 along with the corresponding status of the latching mechanism 1160 in the locked position. By preventing the manual locking mechanism 106 from moving, the latching mechanism 1160 prevents the CBDL door 1100 from opening preventing a breach in arc resistance. The locking projections 1164 are fixed against the locking apertures 1162. As a resulted, the CBDL door 1100 is held in place by both the locking bar 202 and the latching mechanism 1160.

FIG. 15 is an illustrative flowchart showing the process for closing the CBDL door 1100 in an exemplary embodiment. To close the switchgear 500, the CBDL door 1100 is closed (step 1505) and the manual locking mechanism 106 is engaged (step 1510), which causes the locking projections 1164 to engage with the locking apertures 1162. The manual locking mechanism 106 also causes the boomerang latch 1150 to rotate, causing the boomerang latch aperture 1152 to line up with the lock receptacle 212. The solenoid/spring assembly 204 then deenergizes with the circuit breaker 510 active (step 1515), causing the locking bar 202 to interface with the boomerang latch aperture 1152 and the lock receptacle 212 (step 1520). With the locking bar 202 interfacing with both the boomerang latch aperture 1152 and the lock receptacle 212, the CBDL door 1100 cannot open as the locking bar 202 prevents the boomerang latch 1150 from rotating and keeps the locking projections 1164 fixed in the locking aperture 1162.

FIG. 11d shows how the CBLM in an unlocked configuration looks in the interior surface of the CBDL door 1100, while FIG. 14b shows the same embodiment with the boomerang latch 1150 and the locking bar 202 along with the corresponding status of the latching mechanism 1160 in the unlocked position. To open the CBDL door 1100 in the exemplary embodiment, the manipulator shutdown switch 1102 is depressed, which in turn deploys the manipulator shut down rod 1540 as shown in FIG. 11d. As shown in FIGS. 12a-b and 13a-b, deploying the manipulator shutdown rod 1154 acts on the strike plate 1106, which in turn acts on the decoupler 308, which in turn acts on the circuit breaker external tripping mechanism 399. By tripping the circuit breaker external tripping mechanism 399, the spring solenoid assembly 204 energizes, causing the locking bar 202 to retract. The boomerang latch 1150 is now released, allowing the manual latching mechanism 106 to freely rotate and release the latching mechanism 1160 as shown in FIG. 14b. The locking projections 1164 are nested within the locking apertures 1162 but not in a manner that restricts CBDL door 1100 access. The CBDL door 1100 may now be opened.

FIG. 16 is an illustrative flowchart showing the process for opening the CBDL door 1100 in an exemplary embodiment. To open the switchgear 500 in an exemplary embodiment, the manipulator shutdown switch 1102 is depressed (step 1550). The manipulator shutdown rod 1154 then acts on the strike plate 1106 (step 1555). Once the strike plate 1106 is depressed, the spring/solenoid assembly 204 energizes, retracting the locking bar 202 (step 1560).

If the circuit breaker 510 does not need to be moved as further described below (step 1565), the manual locking mechanism 106 is now free to rotate as the locking bar 202 has been withdrawn from the boomerang latch aperture 1152 (step 1585). In rotating the manual locking mechanism 106, the locking projections 1164 are withdrawn from the locking aperture 1162 (step 1585), allowing the CBDL door 1110 to open (step 1590).

To restate the CBDL, it may be described as a system for preventing contact with active electrical equipment, comprising: a switchgear with at least one opening; at least one door allowing access to the interior of said switchgear through said at least one opening; and a locking mechanism to secure said at least one door to said switchgear to prevent access to the interior of said switchgear.

The system further compromises: an internal locking mechanism, comprising: an internal locking control device to control said internal locking mechanism; an internal locking element; an internal locking element deployment device; an internal locking element retraction device; and an internal locking element receptacle dimensioned to receive said internal locking element; an external locking mechanism, comprising: an external locking control device to control said external locking mechanism; at least one door arresting device in communication with said external locking control device dimensioned to receive said internal locking element; and at least one door coupler mechanism in communication with said at least one door arresting device capable of securing said at least one door to said switchgear to close said at least one opening.

The system further comprises: wherein said at least one internal arresting device aperture and said switchgear locking element aperture are in alignment when said external locking control device is in the closed position; wherein said internal locking mechanism uses said internal locking element deployment device to extend said locking bar through said internal arresting device aperture and said locking element aperture when said electrical device is energized; wherein said locking element prevents the movement of the at least one door arresting device, which prevents the operations of the at least external locking control device; wherein said internal locking mechanism disengages using said internal locking element retraction device to disconnect said locking element from said at least one arresting device and said switchgear restriction device; wherein the retraction of said locking element releases said at least one door arresting device; wherein the release of said at least one door arresting deice allows operation of said at least one external locking control device; and wherein said at least one door external locking control can move to an open position, releasing said at least one door coupler mechanism, allowing said at least one door to open and allow access to the interior of said switchgear.

The system may be further expanded into a method for safely controlling access to the interior of an switchgear containing equipment capable of being powered, comprising: securing said switchgear by: closing at least one door; operating a control mechanism to engage a latching mechanism; and engaging a locking mechanism; and wherein said locking mechanism prevents both the opening of said at least one door and prevents the operation of a control mechanism based on whether said at least electrical equipment is powered; and accessing said switchgear by: operating a safety mechanism to depower said electrical equipment; disengaging said locking mechanism; operating a control mechanism to disengage a latching mechanism; and opening said at least one door.

The method may further comprise engaging said locking mechanism occurs by energizing electrical equipment and disengaging said locking mechanism occurs by deenergizing electrical equipment.

Arc Resistant Manipulator

In a further exemplary embodiment, the manipulator shutdown switch 1102 can be modified to allow for the manipulation of the circuit breaker 510 position inside the switchgear 500 without compromising arc resistance by use of an ARM 1101. As shown in FIGS. 17*a-f*, the ARM 1101 is an integrated unit that allows for both circuit breaker 510 disablement and for manipulation of the circuit breaker 510 location. The manipulator shutdown switch 1102 has a wrench interface 1104 so that it can be operated on by with a hand or a wrench. The use of a wrench will allow the operation of a socket 1105 on the distal end of the manipulator shutdown rod 1154. When the manipulator shutdown switch 1102 is depressed, the manipulator shutdown rod 1154 extends accordingly. The ARM 1101 also has an optional cover 1103 that may be used to hold a switch restrictor 314 as shown in FIG. 11*b*. While the ARM 1101 passes through the arc resistant surface 104 of the switchgear 500, it is sealed in a manner that preserves arc resistance.

In an exemplary embodiment, the manipulator shutdown switch 1102 is located on the CBDL door 1100 where it is in line with the worm gear 112 when the CBDL door 1100 is closed. The manipulator shutdown switch 1102 has a wrench interface 1104 that is dimensioned to accept a wrench that can be used to manipulate the manipulator shutdown switch 1102. In an exemplary embodiment, the wrench may cause the manipulator shutdown switch 1102 to rotate. Attaching the wrench to the wrench interface 1104 will depress the manipulator shutdown switch 1102, which will disable the circuit breaker 510 as discussed above with the CBDL. With the manipulator shutdown switch 1102 depressed, the wrench now controls with the worm gear 112, allowing the socket 1105 to directly impact the worm gear 112 as described below. By allowing manipulation of the circuit breaker 510 without opening the CBDL door 110, arc resistance is maintained.

FIG. 16 shows how the ARM 1101 operates. As before, the manipulator shutdown switch 1102 is depressed (step 1550). In this case, the wrench depresses the manipulator shutdown switch 1102. The manipulator shutdown rod 1154 then acts on the strike plate 1106 (step 1555). Once the strike plate 1106 is depressed, the spring/solenoid assembly 204 energizes, retracting the locking bar 202 (step 1560), which impacts the ability to open the CBDL door 1100 but does not impact ARM 1101 operations. If the circuit breaker 510 needs to be moved within the switchgear 500 (step 1565) without opening the CBDL door 1100, then a wrench interfaces with the manipulator shutdown switch 1102 by connecting with the wrench interface 1104 (step 1570). The depressed manipulator shutdown switch 1102 is in communication with the manipulator shutdown rod 1154, which in turn has a socket 1105 that interfaces with the worm gear 112 as it passes through the strike plate aperture 1106 (step 1575). By using a wrench to rotate the manipulator shutdown switch 1102, the manipulator showdown rod 1154 rotates, causing the worm gear 112 to rotate, causing the circuit breaker 510 to change position (step 1580). This allows the circuit breaker 510 to be manipulated while maintaining the arc seal of the switchgear 500. The CBDL door 1100 may open as described above. When the wrench is withdrawn, the manipulator shutdown switch 1102 returns to a deployed position absent other restrictions.

The operations of the ARM 1101 are substantially similar to that previously shown when discussing the MHRED in FIG. 6A-B. The worm gear 112 is manipulated by the ARM 1101, causing the racking device 108 to move the circuit breaker 500.

While the above disclosed embodiment for the ARM 1101 involved the CBDL door 1100, it may be used on any door or surface of the switchgear 500 without departing from the scope the invention. This includes a standard circuit breaker access compartment door 100 or any other surface of a switchgear 500 as long as the ARM 1101 may be position to cause the circuit breaker 510 to move within the switchgear 500 without opening said switchgear 500 and breaching the arc resistant seal.

While this disclosure has referred to a wrench for purposes of manipulating the ARM 1101, it is understood that any tool capable of performing the same manipulations will be acceptable.

One of skill in the art will appreciate that embodiments of the invention provide improved switchgears and improved electrical safety mechanisms at any location where high voltage electrical components are located. Although specific embodiments are illustrated and described herein, it will be appreciated by those of ordinary skill in the art that any arrangement which is calculated to achieve the same purpose can be substituted for the specific embodiments shown. This specification is intended to cover any adaptations or variations of embodiments. In particular, one of skill in the art will appreciate that the names and terminology are not intended to limit embodiments. Furthermore, additional apparatus can be added to the components, functions can be rearranged among components, and new components corresponding to future enhancements and future physical devices used in embodiments can be introduced without departing from the scope of the invention. The terminology used in this application is intended to include all embodiments and alternatives which provide the same functionality as described herein.

The invention claimed is:

1. An apparatus to manipulate an electrical device in a switchgear, comprising:
    an interior projection; and
    an exterior button in communication with said interior projection;
    wherein movement of said exterior button causes a corresponding movement by said interior projection;
    wherein said apparatus is at least partially inserted into an aperture in said switchgear between an exterior surface of said switchgear and an interior surface of said switchgear;
    wherein said apparatus is coupled to said switchgear;
    wherein said exterior button protrudes from said exterior surface of said switchgear;
    wherein the combination of said switchgear with said apparatus in said aperture is arc resistant.

2. The apparatus of claim 1,
    wherein said interior projection further comprises a tool;
    wherein said tool is in alignment with a mechanism to move a circuit breaker;
    wherein depressing of said button causes said tool to come into contact with said mechanism to move said circuit breaker;
    wherein operation of said tool can manipulate said mechanism to move said circuit breaker when said tool is in contact with said mechanism to move said circuit breaker;
    wherein said exterior button further comprises an interface allowing a wrench to manipulate said exterior button; and
    wherein said manipulation of said exterior button manipulates said interior projection while maintaining arc resistance.

3. The apparatus of claim 2,
    wherein use of said wrench on said exterior button causes a lateral movement of said interior projection, causing said tool to interface with said mechanism to move said circuit breaker; and
    wherein manipulation of said exterior button by said wrench causes a corresponding movement in said interior projection, causing a corresponding movement in said tool on said mechanism to move said circuit breaker.

4. The apparatus of claim 3, wherein said lateral movement of said interior projection interacts with a mechanism to disable said circuit breaker.

5. The apparatus of claim 4, wherein said mechanism to disable said circuit breaker comprises:
    a strike plate that is acted on when said interior projection moves laterally; and
    a decoupler connected to said strike plate;
    wherein movement of said strike plate causes movement of said decoupler, tripping an external tripping mechanism of said circuit breaker.

6. The apparatus of claim 1, wherein said interior projection and said exterior button are a single integrated unit.

7. The apparatus of claim 1, wherein said apparatus is incorporated into said switchgear in an arc resistant manner.

8. The apparatus of claim 1, wherein the operation of said apparatus maintains the arc resistance of said switchgear.

* * * * *